United States Patent
Masteller et al.

(10) Patent No.: US 12,416,932 B2
(45) Date of Patent: Sep. 16, 2025

(54) PRESSURE REGULATORS WITH ADJUSTABLE BOOST BODIES

(71) Applicant: Emerson Process Management Regulator Technologies, Inc., McKinney, TX (US)

(72) Inventors: Jeffrey Campbell Masteller, McKinney, TX (US); Keltan Travis Forrest, Richardson, TX (US); Justin Lane Masias, McKinney, TX (US); Andrew Da Costa, Plano, TX (US); Ruben Longoria, Little Elm, TX (US); Alexander John Ferguson, Denton, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 18/584,510

(22) Filed: Feb. 22, 2024

(65) Prior Publication Data

US 2024/0361787 A1    Oct. 31, 2024

Related U.S. Application Data

(63) Continuation-in-part of application No. 18/475,985, filed on Sep. 27, 2023.
(Continued)

(51) Int. Cl.
*G05D 16/00* (2006.01)
*F16K 31/365* (2006.01)

(52) U.S. Cl.
CPC ......... *G05D 16/024* (2019.01); *F16K 31/365* (2013.01)

(58) Field of Classification Search
CPC ............... G05D 16/0688; G05D 16/02; G05D 16/0694; G05D 16/063; G05D 16/0683;
(Continued)

(56) References Cited

U.S. PATENT DOCUMENTS

| 3,086,548 A | 4/1963 | Galiger |
| 4,491,149 A | 1/1985 | Trinkwalder |

(Continued)

FOREIGN PATENT DOCUMENTS

| EP | 3497533 B1 | 2/2021 |
| FR | 2466800 A1 | 4/1981 |

OTHER PUBLICATIONS

International Searching Authority, "International Search Report," issued in connection with International Patent Application No. PCT/US2022/035144 mailed on Oct. 11, 2022, 2 pages.
(Continued)

*Primary Examiner* — Jessica Cahill
(74) *Attorney, Agent, or Firm* — Hanley, Flight & Zimmerman, LLC

(57) ABSTRACT

Pressure regulators with adjustable boost bodies are described herein. An example pressure regulator includes a valve body; a seat in the fluid passageway; an actuator casing coupled to the valve body; and a plug assembly including: a stem; a plug coupled to the stem; a stem guide disposed in the channel of the actuator casing; a boost body on the second side of the stem guide; and a tube extending through the boost body, the tube and the boost body forming a unitary structure to prevent movement of the tube relative to the boost body, the tube having a first end and a second end, the second end disposed in a downstream location relative to the seat, wherein the boost body is rotatable with respect to the stem guide to position the tube in at least one other orientation relative to the actuator casing.

17 Claims, 22 Drawing Sheets

Related U.S. Application Data

(60) Provisional application No. 63/498,970, filed on Apr. 28, 2023.

(58) Field of Classification Search
CPC ............... G05D 16/103; G05D 16/024; Y10T 137/7819; Y10T 137/7831; Y10T 137/7801; Y10T 137/7809; Y10T 137/7812; Y10T 137/7818; F16K 31/165; F16K 31/365
See application file for complete search history.

(56) References Cited

U.S. PATENT DOCUMENTS

| | | | |
|---|---|---|---|
| 4,715,232 A | 12/1987 | Buettner | |
| 4,754,778 A | 7/1988 | Duffy | |
| 5,313,980 A | 5/1994 | Carlson | |
| 5,622,207 A * | 4/1997 | Frank | E03B 7/12 137/561 A |
| 8,240,327 B2 * | 8/2012 | Hawkins | F16K 1/00 137/489.5 |
| 8,281,803 B2 * | 10/2012 | Mevius | G05D 16/0694 137/505.46 |
| 9,354,639 B2 | 5/2016 | Fan | |
| 9,678,516 B2 | 6/2017 | Fan et al. | |
| 10,001,785 B2 * | 6/2018 | Sanders | G05D 7/012 |
| 10,168,717 B2 * | 1/2019 | Lin | G05D 16/0688 |
| 10,247,320 B2 * | 4/2019 | Zhou | G05D 16/0683 |
| 2009/0261281 A1 * | 10/2009 | Mevius | G05D 16/0694 251/118 |
| 2010/0071786 A1 * | 3/2010 | Hawkins | F16K 17/32 137/485 |
| 2011/0174381 A1 | 7/2011 | Foust | |
| 2013/0228240 A1 | 9/2013 | Noceti | |
| 2013/0255791 A1 | 10/2013 | Nashery | |
| 2014/0083530 A1 | 3/2014 | Fan | |
| 2014/0090727 A1 | 4/2014 | Nguyen et al. | |
| 2015/0234395 A1 | 8/2015 | Fan et al. | |
| 2015/0345654 A1 | 12/2015 | Carmen et al. | |
| 2016/0069469 A1 * | 3/2016 | Sanders | G05D 16/02 73/714 |
| 2018/0046204 A1 * | 2/2018 | Lin | G05D 16/0688 |
| 2020/0133317 A1 * | 4/2020 | Wang | G05D 16/0691 |

OTHER PUBLICATIONS

International Searching Authority, "Written Opinion of the International Searching Authority," issued in connection with International Patent Application No. PCT/US2022/035144, dated Oct. 11, 2022, 6 Pages.

United States Patent and Trademark Office, "Non-Final Office Action", issued in connection with U.S. Appl. No. 17/459,142, mailed on Feb. 13, 2023, 13 pages.

United States Patent and Trademark Office, "Notice of Allowance," issued in connection with U.S. Appl. No. 17/459,142, mailed on Mar. 22, 2023, 8 pages.

United States Patent and Trademark Office, "Non-Final Office Action," issued in connection with U.S. Appl. No. 18/355,845, dated Feb. 9, 2024, 14 pages.

International Searching Authority, "International Preliminary Report on Patentability," issued in connection with International Application No. PCT/US2022/035144, dated Feb. 27, 2024, 7 pages.

United States Patent and Trademark Office, "Notice of Allowance," issued in connection with U.S. Appl. No. 18/355,845, dated Apr. 10, 2024, 8 pages.

European Patent Office, "Extended European Search Report," issued in connection with European Patent Application No. 24172263.6-1201, mailed on Sep. 25, 2024, 8 pages.

European Patent Office, "Communication pursuant to Article 94(3) EPC," issued in connection with European Patent Application No. 22 748 124.9, dated Dec. 19, 2024, 5 pages.

United States Patent and Trademark Office, "Non-Final Office Action," issued in connection with U.S. Appl. No. 18/475,985, dated Jan. 27, 2025, 14 pages.

Canadian Intellectual Property Office, "Examiner requisition," issued in connection with Canadian Patent Application No. 3,229,947, dated Mar. 11, 2025, 4 pages.

European Patent Office, "Communication pursuant to Article 94(3) EPC," issued in connection with European Patent Application No. 22 748 124.9, dated Apr. 7, 2025, 6 pages.

United States Patent and Trademark Office, "Notice of Allowance and Fee(s) Due," issued in connection with U.S. Appl. No. 18/475,985, dated Mar. 27, 2025, 7 pages.

* cited by examiner

US 12,416,932 B2

PRESSURE REGULATORS WITH ADJUSTABLE BOOST BODIES

RELATED APPLICATIONS

This patent arises from a continuation-in-part of U.S. patent application Ser. No. 18/475,985, which was filed on Sep. 27, 2023, and which claims the benefit of U.S. Provisional Patent Application No. 63/498,970, filed on Apr. 28, 2023. U.S. patent application Ser. No. 18/475,985 and U.S. Provisional Patent Application No. 63/498,970 are hereby incorporated herein by reference in their entireties. Priority to U.S. patent application Ser. No. 18/475,985 and U.S. Provisional Patent Application No. 63/498,970 is hereby claimed.

FIELD OF THE DISCLOSURE

This disclosure relates generally to process control devices and, more particularly, to pressure regulators with adjustable boost bodies.

BACKGROUND

Pressure regulators, sometimes referred to as fluid regulators, are commonly distributed throughout process control systems to control flow rates and/or pressures of various fluids (e.g., liquids, gases, etc.). Pressure regulators can be used to regulate the pressure of a fluid to a substantially constant value. For example, a pressure regulator typically has an inlet that receives a supply of process fluid at a relatively high pressure and reduces the pressure to a lower and/or substantially constant pressure at an outlet.

SUMMARY

A pressure regulator disclosed herein includes a valve body defining a fluid passageway between an inlet and an outlet, a seat in the fluid passageway, and an actuator casing coupled to the valve body. The actuator casing defines a pressure sense chamber and a channel between the pressure sense chamber and the fluid passageway in the valve body. The pressure regulator also includes a plug assembly including a stem, a plug coupled to the stem, and a stem guide disposed in the channel of the actuator casing. The stem is moveable in the stem guide to move the plug relative to the seat. The stem guide has a first side facing the pressure sense chamber and a second side facing the fluid passageway. The plug assembly also includes a boost body on the second side of the stem guide and a tube extending through the boost body. The tube and the boost body forming a unitary structure to prevent movement of the tube relative to the boost body. The tube has a first end and a second end. The second end disposed in a downstream location relative to the seat such that the pressure sense chamber is in fluid communication with the downstream location. The boost body is rotatable with respect to the stem guide to position the tube in at least one other orientation relative to the actuator casing.

A pressure regulator disclosed herein includes a valve body defining a fluid passageway between an inlet and an outlet, a seat in the fluid passageway, and an actuator casing coupled to the valve body. The actuator casing defines a pressure sense chamber and a channel between the pressure sense chamber and the fluid passageway in the valve body. The pressure regulator also includes a plug assembly including a stem, a plug coupled to the stem, and a stem guide disposed in the channel of the actuator casing. The stem is moveable in the stem guide to move the plug relative to the seat. The stem guide has a first side facing the pressure sense chamber and a second side facing the fluid passageway. The stem guide has a flange with a notch. The plug assembly also includes a means for orienting a boost body with a tube from a first orientation to a second orientation relative to the valve body.

A plug assembly for a pressure regulator disclosed herein includes a boost body on a side of a stem guide and a tube extending through a boost body. The tube and the boost body forming a unitary structure to prevent movement of the tube relative to the boost body. The tube having a first end and a second end. The second end to be disposed in a downstream location relative to a seat in a fluid passageway such that a pressure sense chamber is in fluid communication with the downstream location. The boost body is moveable away from the side of the stem guide and rotatable relative to the stem guide to position the tube.

Figure 1:
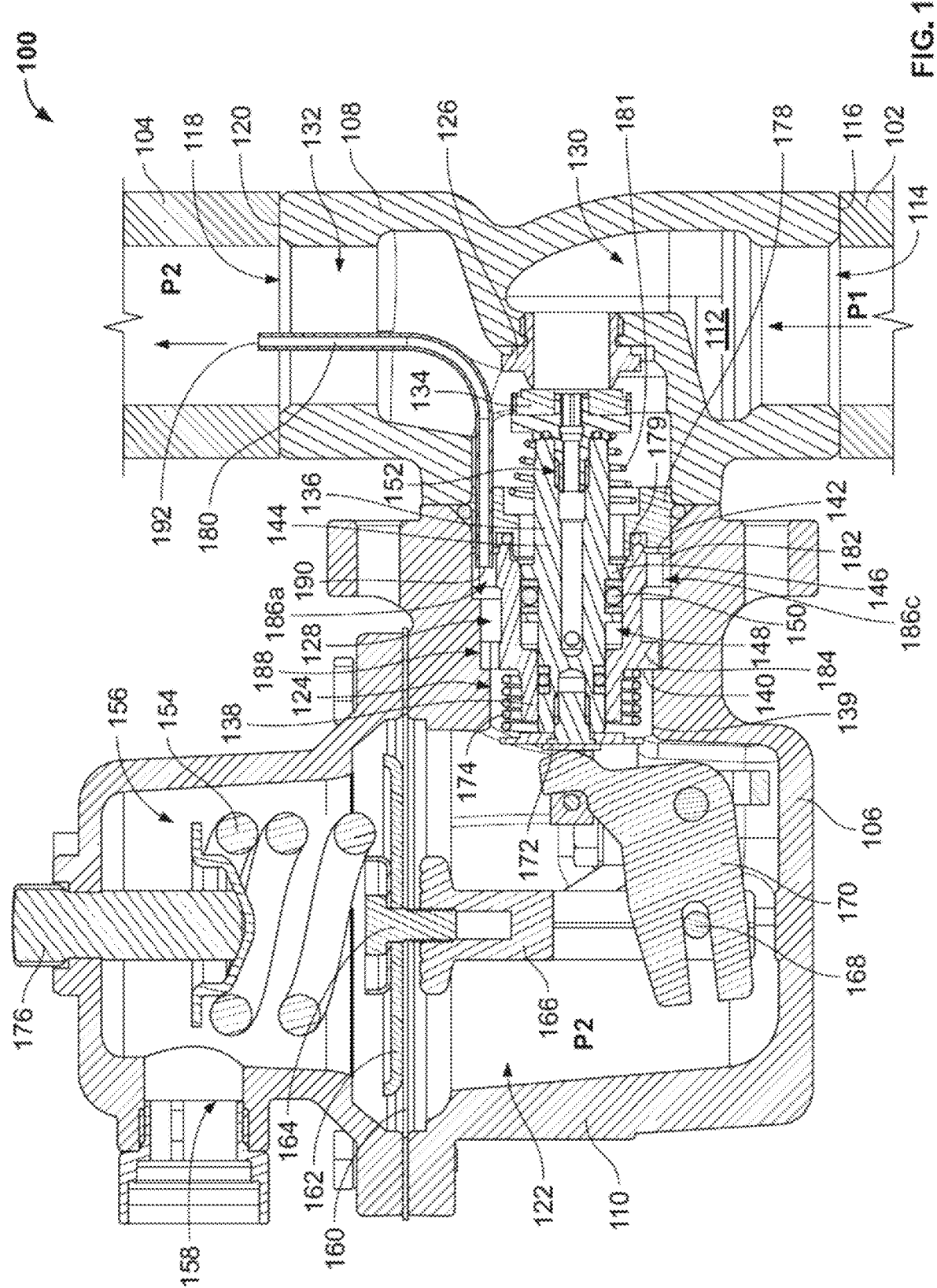
FIG. 1 is a cross-sectional view of an example pressure regulator having an example plug assembly with an example adjustable boost body constructed in accordance with the teachings of this disclosure.
Figure 2D:
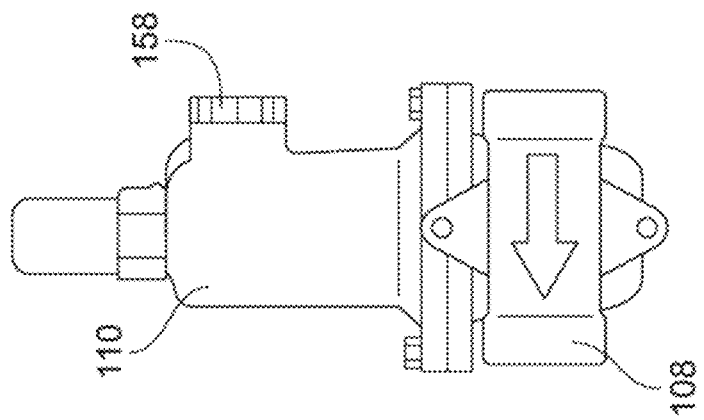
FIG. 2A-2D show the example pressure regulator of FIG. 1 with an example valve body in different orientations.
Figure 2C:
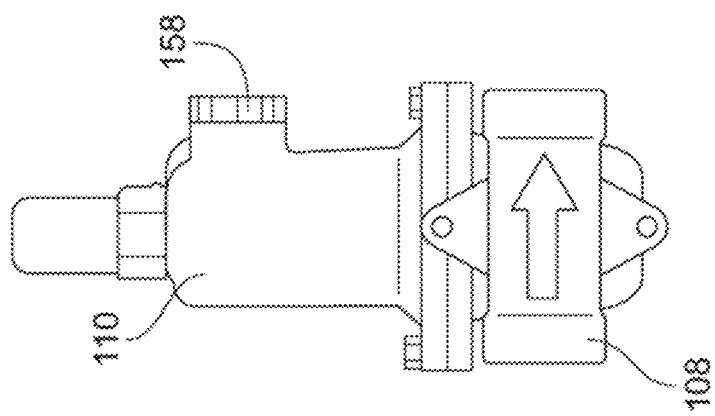
Figure 2B:
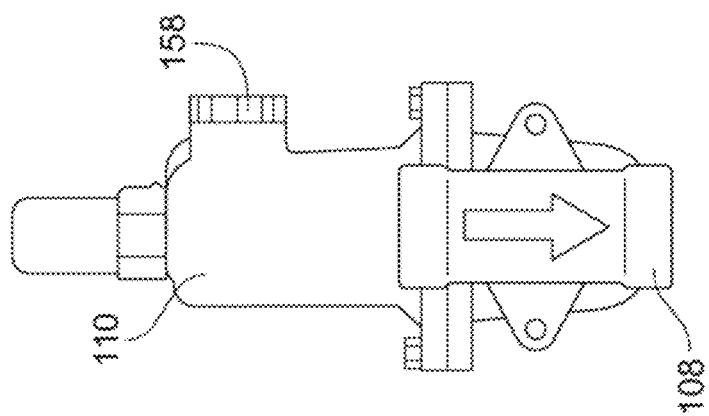
Figure 2A:
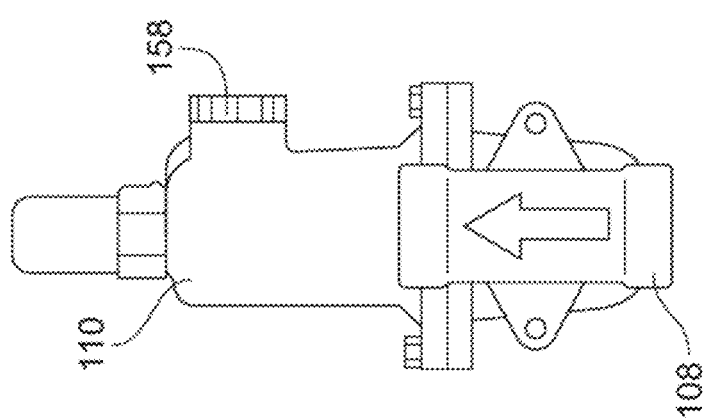

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

DETAILED DESCRIPTION

In general, pressure regulators (sometimes referred to as fluid regulators) modulate the flow of fluid in accordance with a sensed downstream pressure to maintain process system pressures within acceptable and/or constant pressure limits. Pressure regulators typically include a plug assembly having a stem guide, a stem slidably disposed in the stem guide, and a plug coupled to the stem. The stem guide is disposed in a channel formed in an actuator casing of the pressure regulator. The pressure regulator includes a valve body, which is coupled to the actuator casing, and defines a fluid passageway between an inlet and an outlet. The stem is moveable to move the plug relative to a seat in the fluid passageway to control the flow of fluid through the fluid passageway between the inlet and the outlet. Pressure regulators also include a diaphragm coupled to the stem. The diaphragm separates a pressure sense chamber from a control chamber. The pressure sense chamber is fluidly coupled to and receives fluid from a downstream point. The stem is disposed between the pressure sense chamber and the fluid passageway. The diaphragm moves in response to a difference in force between a force exerted by the pressure of the fluid in the pressure sense chamber (from the sensed downstream point) and the control chamber (e.g., set via a spring). Movement of the diaphragm causes the plug to move away from or toward the seat to allow or restrict the flow of fluid through the fluid passageway and, thus, between the inlet and the outlet of the pressure regulator.

In some examples, the pressure sense chamber is fluidly coupled by a boost body to a location in the fluid passageway that is immediately downstream of the seat in the valve body of the pressure regulator. This is often referred to as an internal sense pressure regulator. However, the pressure in this location is often relatively high, even when the pressure regulator is closed. This can cause a delay in opening the pressure regulator. As such, the pressure regulator may not quickly respond to changes in pressure.

Disclosed herein are example plug assemblies that include a tube (e.g., a sense tube) that extends through the boost body and is aligned with a notch in a flange of the stem guide. The tube forms a passageway that places the pressure sense chamber in fluid communication with a point that is further downstream in the fluid passageway. Therefore, the pressure sense chamber senses pressure that is further downstream of the seat than known boost bodies. This location further downstream has a lower pressure and higher velocity, which enables the pressure regulator to open more quickly to compensate for mechanical droop of the regulator and allow for the measured pressure to increase.

In some examples, the tube includes a curved portion that forms a 90° turn or bend, which enables the tube to extend relatively far down the center of the fluid passageway downstream of the seat. In some examples, the boost body is adjustable to change the direction that the tube curves relative to the actuator casing. This enables the actuator casing and the valve body to be coupled at different orientations while still enabling the tube to extend down the middle of the downstream portion of the valve body. In some examples, the stem guide has multiple notches, and the boost body can be rotated to align the tube with the different notches depending on the desired orientation of the tube. Therefore, a relatively long tube can be used, while still enabling the actuator casing and the valve body to be coupled at different rotational orientations. This allows the actuator casing and valve body to be coupled at different orientations, which is desirable when installing the pressure regulator between pipes.

FIG. 1 is a cross-sectional view of an example pressure regulator 100 constructed in accordance with the teachings of this disclosure. The example pressure regulator 100 can be used to regulate and/or otherwise control the flow and/or pressure of a process fluid. The process fluid can be any type of fluid, such as natural gas, oil, water, etc. For example, FIG. 1 shows the example pressure regulator 100 installed between an upstream pipe 102 and a downstream pipe 104. The upstream pipe 102 supplies process fluid from an upstream source (e.g., a distribution facility), and the downstream pipe 104 directs the process fluid to a downstream location (e.g., a customer). The pressure regulator 100 can be used to regulate and/or control the pressure of the fluid between the upstream pipe 102 and the downstream pipe 104. For example, the pressure regulator 100 can be used to reduce the pressure from a first pressure P1 in the upstream pipe 102 to a second pressure P2 in the downstream pipe 104. The downstream pressure P2 may be based on the downstream location capacity and/or demands.

In the illustrated example of FIG. 1, the pressure regulator 100 includes a device body 106 (e.g., a casing, a housing, etc.). In this example, the device body 106 includes a valve body 108 (sometimes referred to as a regulator body or housing) and an actuator casing 110 that are coupled together (e.g., via one or more bolts). However, in other examples, the device body 106 can include more or fewer bodies or housings. In the illustrated example, the valve body 108 defines a fluid passageway 112 between an inlet 114 at a first end 116 of the valve body 108 and an outlet 118 at a second end 120 of the valve body 108. The upstream pipe 102 is coupled to the first end 116 of the valve body 108 at the inlet 114, and the downstream pipe 104 is coupled to the second end 120 of the valve body 108 at the outlet 118. In some examples, the downstream pipe 104 is threaded into the valve body 108 at the outlet 118. In the illustrated example, the actuator casing 110 defines a pressure sense chamber 122. The actuator casing 110 also defines a channel 124 (e.g., an opening, a passageway, etc.) between the fluid passageway 112 and the pressure sense chamber 122.

In the illustrated example, the pressure regulator 100 includes a seat 126 (e.g., a seal) in the fluid passageway 112. The pressure regulator 100 also includes an example plug assembly 128. The plug assembly 128 controls the flow of fluid through the seat 126 and, thus, between the inlet 114 and the outlet 118. The seat 126 divides the fluid passageway 112 into an upstream portion 130 (upstream of the seat 126) and a downstream portion 132 (downstream of the seat 126).

In the illustrated example, the plug assembly 128 includes a plug 134 (sometimes referred to as a disc or flow control member), a stem 136, and a stem guide 138. The plug 134 is coupled to the stem 136. In the illustrated example, the stem 136 extends through the stem guide 138. The stem 136 is moveable (e.g., slidable) in the stem guide 138 to move the plug 134 toward or away from the seat 126, thereby controlling the flow of fluid through the seat 126. In particular, the plug 134 can be moved between a closed position, which is shown in FIG. 1, and an open position. In the closed position, the plug 134 is sealingly engaged with the seat 126, which prevents fluid flow through the seat 126 from the inlet 114 to the outlet 118. In the open position, the plug 134 is moved to the left in FIG. 1 such that the plug 134 is spaced from the seat 126, which allows fluid to flow through the seat 126 from the inlet 114 to the outlet 118. Therefore, the seat 126 and the plug 134 form a valve. The pressure regulator 100 is configured to move the plug 134 between the opened and closed positions to regulate the pressure of the fluid downstream.

In the illustrated example, the stem guide 138 is disposed in the channel 124 between the fluid passageway 112 and the pressure sense chamber 122. The stem guide 138 is sealed relative to the device body 106 to fluidly isolate the fluid in the fluid passageway 112 and fluid in the pressure sense chamber 122 (except for designated passages for pressure sense, disclosed in further detail herein). In some examples, the stem guide 138 is sized to form an interference fit (sometimes referred to as friction fit or press fit) with an inner surface 139 of the channel 124. Additionally or alternatively, one or more seals can be used. The stem guide 138 has a first side 140 and a second side 142 opposite the first side 140. The first side 140 faces the pressure sense chamber 122 and is exposed to the pressure sense chamber 122. The second side 142 faces the fluid passageway 112.

In this example, the example pressure regulator 100 balances the stem 136 to reduce or eliminate the influence of the pressure differential on the stem 136 and the plug 134. In the illustrated example, the stem 138 has a stem body 144 and a flange 146 extending radially from the stem body 144. The stem guide 138 and the flange 146 form a balance chamber 148. The flange 146 is sealed to an inner surface of the stem guide 138 via a seal 150. As such, the flange 146 fluidly separates the balance chamber 148 and the downstream portion 132 of the fluid passageway 112.

In the illustrated example, a balance passage 152 (which may also be referred to as a balance port) is defined through the plug 134 and the stem 136 that extends to the balance chamber 148. In particular, a portion of the balance passage 152 extends longitudinally through the stem 136, and another portion of the balance passage 152 extends in a transverse direction (e.g., into or out of the page in FIG. 1) to the outer surface of the stem 136. Upstream or inlet fluid pressure is delivered to the balance chamber 148 through the balance passage 152. Thus, upstream or inlet fluid pressure acts on the stem 136 in the balance chamber 148 to counter the upstream or inlet fluid pressure acting on the plug 134. Therefore, in this example, the balance passage 152 forms means for fluidly coupling the upstream portion 130 of the fluid passageway 112 and the balance chamber 148. In other examples, the balance passage 152 could be formed by one or more openings or channels through one or more other structures.

As shown in FIG. 1, the pressure regulator 100 includes a control spring 154. The control spring 154 is used to control or set the pressure at which the pressure regulator 100 opens and closes. The control spring 154 is disposed in a control chamber 156 in the actuator casing 110. In some examples, the control chamber 156 is open to the atmosphere via a vent opening 158. In other examples, a fluid line can be coupled to the vent opening 158 to place the control chamber 156 at a different pressure than atmosphere. In the illustrated example, the pressure regulator 100 includes a diaphragm 160 that separates the control chamber 156 and the pressure sense chamber 122. The pressure regulator 100 includes a diaphragm plate 162 that is coupled to the diaphragm 160 via a diaphragm cap screw 164. The control spring 154 is engaged with the diaphragm plate 162, which biases the diaphragm plate 162 and the diaphragm 160 toward the pressure sense chamber 122 (downward in FIG. 1). The diaphragm plate 162 is coupled to a pusher post 166 (e.g., via the diaphragm cap screw 164). The pusher post 166 includes a drive pin 168 that cooperates with a lever 170. The lever 170 is pivotably coupled to the actuator casing 110. The lever 170 is coupled to a stem pin 172 that is coupled to the stem 136. As the pusher post 166 moves up and down, the pusher post 166 rotates the lever 170, which moves the stem 136 linearly in the stem guide 138 (left and right in FIG. 1).

The pressure regulator 100 receives fluid at the inlet 114 at the first pressure P1. The pressure regulator 100 is configured to stop or reduce the flow of fluid to the outlet 118 based on pressure of fluid at a downstream point, referred to as the second pressure P2. If the pressure P2 meets or exceeds a certain pressure (which may be referred to herein as a set or trigger pressure), the pressure regulator 100 closes the fluid passageway 112, thereby regulating the pressure of the fluid at the downstream point. In the illustrated example, the pressure sense chamber 122 receives fluid from downstream of the seat 126 via a boost body and tube, as disclosed in further detail herein. Therefore, the pressure sense chamber 122 is at the second pressure P2. When the pressure P2 in the pressure sense chamber 122 reaches the set pressure, the pressure P2 overcomes the force of the control spring 154 and forces the diaphragm 160 upward in FIG. 1. As the diaphragm 160 and the diaphragm plate 162 move upward, the pusher post 166 rotates the lever 170 clockwise in FIG. 1. The lever 170 pushes the stem 136 to the right in FIG. 1, until the plug 134 engages the seat 126 to close off the fluid passageway 112, as shown in the position in FIG. 1. This reduces the pressure of the fluid at the downstream point. When the pressure P2 of the fluid in the pressure sense chamber 122 drops below the set pressure, the spring force overcomes the pressure and moves the diaphragm 160 and the diaphragm plate 162 downward. The pusher post 166 moves downward and rotates the lever 170 in the opposite direction. In some examples, the pressure regulator 100 includes a return spring 174 to bias the stem 136 back to the left in FIG. 1, such that the plug 134 moves away from the seat 126. Therefore, the set pressure is based on the spring force from the control spring 154. In some examples, the spring force of the control spring 154 can be increased or decreased to change the set pressure to a desired pressure level. For example, an adjustment screw 176 can be adjusted to increase or decrease the compression of the control spring 154 and, thus, change the force the control spring 154 exerts on the diaphragm 160.

As disclosed above, the pressure sense chamber 122 is fluidly coupled and/or otherwise senses pressure at a location that is downstream of the seat 126. As shown in FIG. 1, the plug assembly 128 includes a boost body 178 and a tube 180 (which may also be referred to as a pitot tube or sense tube). The boost body 178 is disposed in the channel 124 on the second side 142 of the stem guide 138. The boost body 178 is sealed against the second side 142 of the stem guide 138 by a seal 179 (e.g., an o-ring). As shown in FIG. 1, the plug assembly 128 includes a spring 181 to bias the boost body 178 toward the stem guide 138. In this example, the spring 181 is between the plug 134 and the boost body 178. In other examples, the spring 181 can be disposed in another location (e.g., between the boost body 178 and a portion of the valve body 108). In this example, the spring 181 is a conical compression spring. In other examples, the spring 181 can be implemented by another type of spring, such as a constant pitch helical compression spring. The tube 180 is coupled to the boost body 178. In the illustrated example, a portion of the tube 180 extends through the boost body 178 and into the stem guide 138. In particular, the stem guide 138 has a first flange 182 and a second flange 184. The second flange 184 is spaced from (in the axial direction) the first flange 182. The first and second flanges 182, 184 can also be referred to as discs. The first and second flanges 182, 184 are engaged (e.g., in contact) with the inner surface 139 of the channel 124. The first flange 182 has a set of notches 186a-186d (the first and second notches 186a and 186c are shown in FIG. 1) that extend into the peripheral edge of the first flange 182. The second flange 184 has a notch 188 to enable fluid flow across the second flange 184. The tube 180 has a first end 190 and a second end 192 opposite the first end 190. As shown in FIG. 1, the tube 180 extends through the boost body 178 and is aligned with the first notch 186a in the first flange 182 of the stem guide 138. In particular, in this example, the first end 190 extends into and is disposed in the first notch 186a. The second end 192 is disposed in a downstream location of the seat 126. As such, fluid from the second end 192 of the tube 180 is directed through the tube 180, through the first notch 186a, through the cavity between the stem guide 138 and the inner surface of the channel 124, and through the notch 188 in the second flange 184 of the stem guide 138 and into the pressure sense chamber 122. Therefore, the tube 180 fluidly couples the downstream location at the second end 192 of the tube 180 with the pressure sense chamber 122. As such, the pressure sense chamber 122 is at the same pressure as the fluid at the downstream location where the second end 192 of the tube 180 is located.

In this example, the tube 180 is curved and includes a 90° turn or bend (e.g., a curve or bend). This enables the tube 180 to extend further down the fluid passageway 112 away from the seat 126. In some examples, this is advantageous because the pressure further downstream is sensed as a lower pressure. This enables the pressure regulator 100 to open faster or earlier by reducing feedback delay to compensate for mechanical droop of the pressure regulator 100. In known regulators, the pressure sense chamber 122 senses the pressure of the fluid immediately adjacent to the seat 126. However, the pressure next to the seat 126 is higher than the pressure downstream as the pressure regulator 100 opens and allows more flow. This higher pressure maintains the pressure regulator 100 closed longer. By extending the tube 180 further downstream, as shown in FIG. 1, the pressure sense chamber 122 can sense a lower pressure than immediately adjacent to the seat 126. This enables the pressure regulator 100 to open more quickly by accounting or compensating for mechanical droop.

In some examples, the second end 192 of the tube 180 is located at or near the second end 120 of the valve body 108. In the illustrated example, the second end 192 of the tube 180 extends beyond or past the second end 120 of the valve body 108. As such, a portion of the tube 180 extends into the downstream pipe 104. In some examples, it is advantageous to sense the pressure just outside of the valve body 108, because this pressure registers as a lower pressure to achieve the benefits discussed above. However, in other examples, the tube 180 may be longer or shorter such that the tube 180 extends further into the downstream pipe 104, or the second end 192 may be in the downstream portion 132 of the fluid passageway 112.

In some examples, the valve body 108 and the actuator casing 110 can be coupled to each other in different orientations. For example, FIGS. 2A-2D show four different orientations of the valve body 108 relative to the actuator casing 110. The orientation may be chosen by an installer for a specific installation. In some examples, the desired orientation may be based on the existing pipe setup and the desired orientation of the valve body 108 and/or the actuator casing 110 relative to each other. For example, it may be desirable to orient the actuator casing 110 vertically, while the valve body 108 can be orientated to match the direction of the upstream and downstream pipes. In another example, the pressure regulator 100 may be connected to a pre-existing pipe, and it may be desirable to orient the actuator casing 110 such that the vent opening 158 is facing vertically downward, which helps prevent rain or other precipitation from entering the vent opening 158. In this example, the valve body 108 and the actuator casing 110 can be coupled in four different orientations (e.g., at 90° increments), which may be based on a bolt pattern between the valve body 108 and the actuator casing 110.

Figure 3:
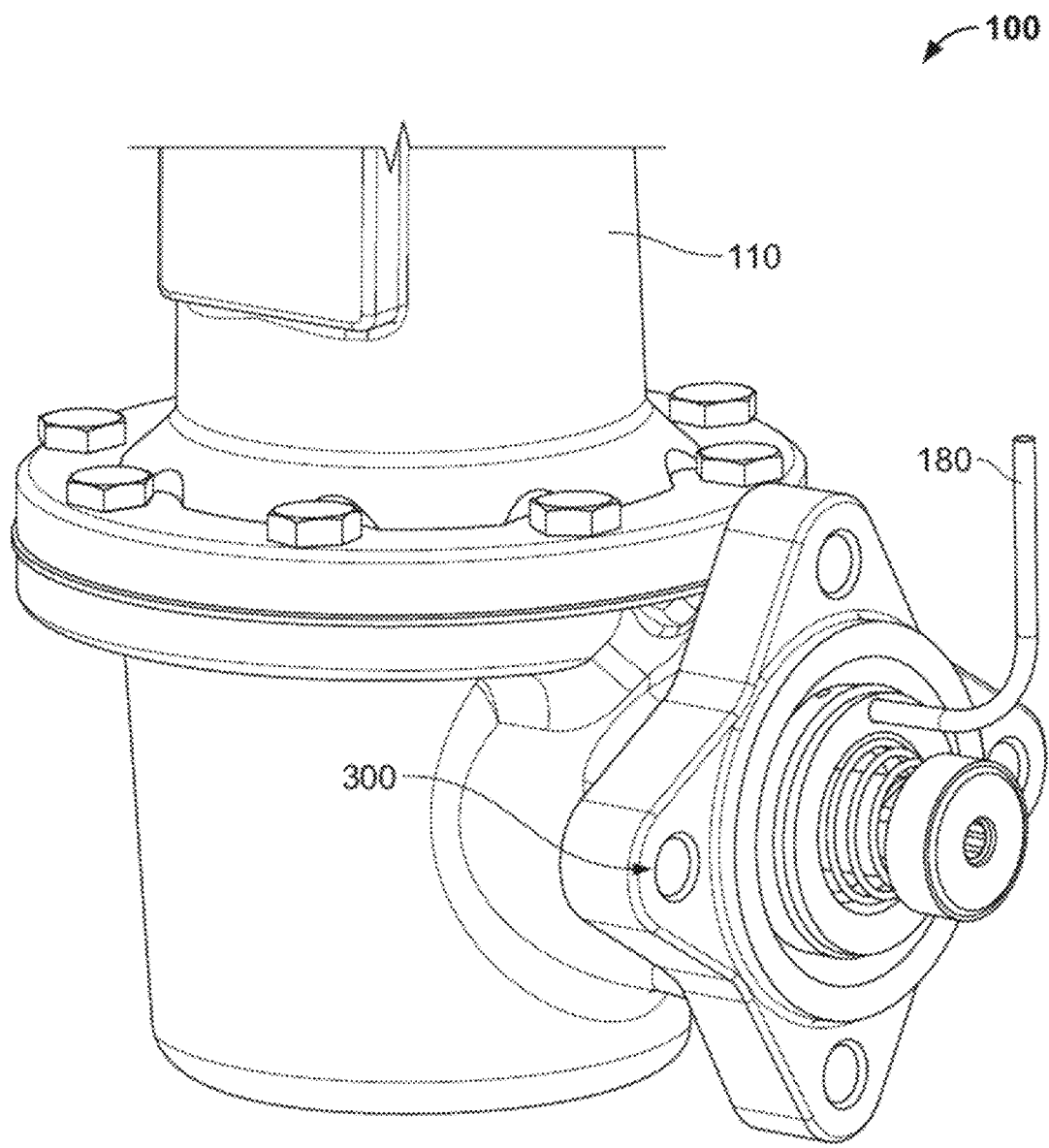
FIG. 3 is a perspective view of the example pressure regulator of FIG. 1 with the example valve body removed.

As disclosed above, the tube 180 extends in a certain direction away from the boost body 178 (e.g., upward in FIG. 1). For example, FIG. 3 is a perspective view of the pressure regulator 100 with the valve body 108 removed. As shown in FIG. 3, the actuator casing 110 has four flange bolt openings 300 (one of which is referenced in FIG. 3). The valve body 108 (FIG. 1) can be coupled to the actuator casing 110 in one of four orientations (shown in FIGS. 2A-2D) based on the bolt pattern. As shown, the tube 180 is curved upward in the orientation in FIG. 3. Therefore, to rotate the valve body 108 to another orientation (e.g., horizontal), the tube 180 is reoriented so the tube 180 can remain centered in the downstream portion 132 (FIG. 1) of the fluid passageway 112 (FIG. 1).

Figure 4:
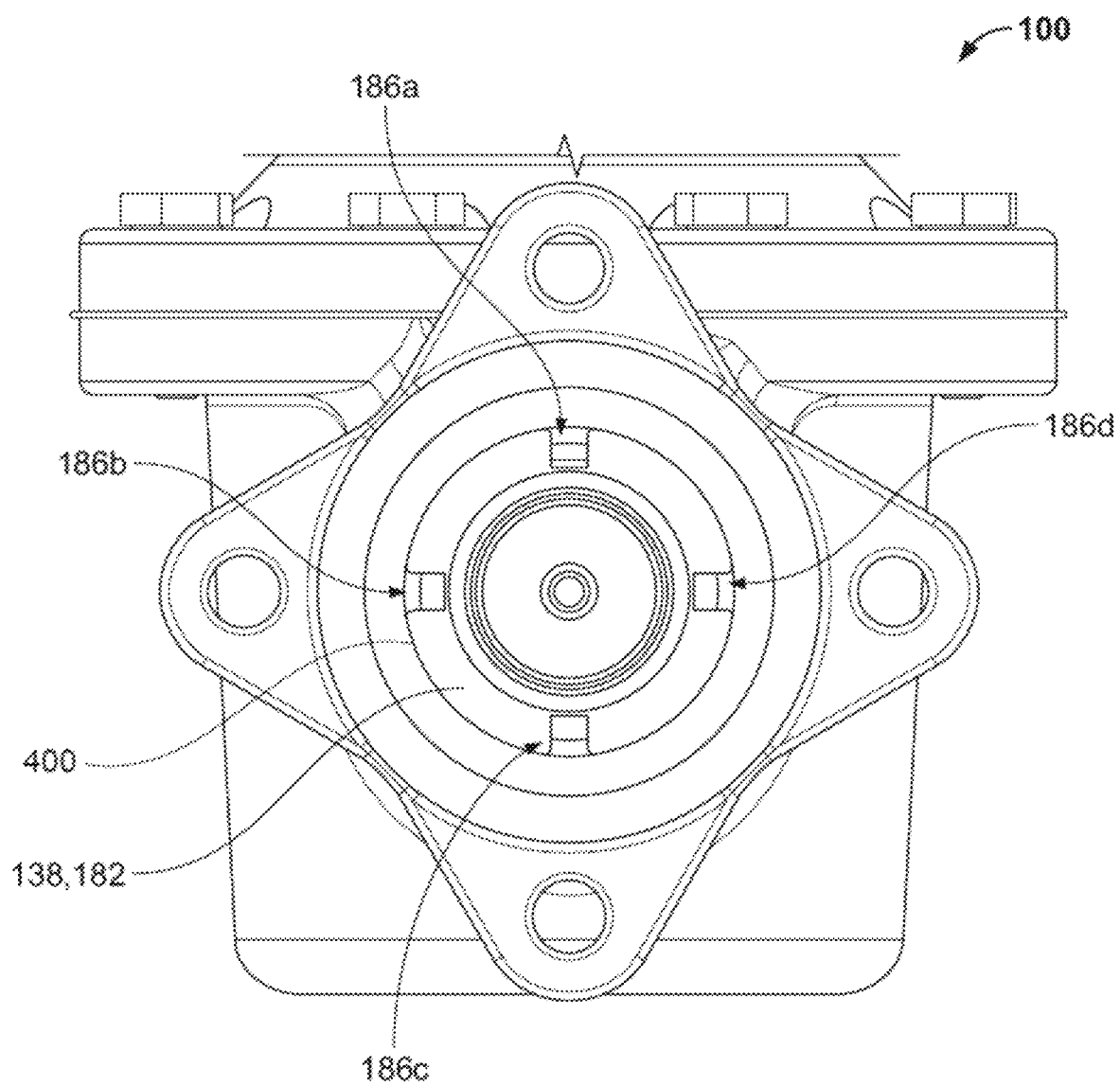
FIG. 4 is a side view of the example pressure regulator of FIG. 3 with the example boost body and an example tube removed.

FIG. 4 is a side view of the pressure regulator 100 of FIG. 3 with the boost body 178 and the tube 180 removed. As disclosed above, the first flange 182 of the stem guide 138 includes the four notches 186a-186d. This enables the tube 180 to be inserted into other ones of the notches 186a-186d depending on the desired orientation of the tube 180. Therefore, the tube 180 can be moved to other positions and/or orientations relative to the stem guide 138. In the illustrated example, the notches 186a-186d extend into a peripheral edge 400 of the first flange 182 of the stem guide 138. However, in other examples, the notches 186a-186d may instead be formed by openings (e.g., through-holes, channels) that extend through the first flange 182 and do not extend to the peripheral edge 400.

Figure 5A:
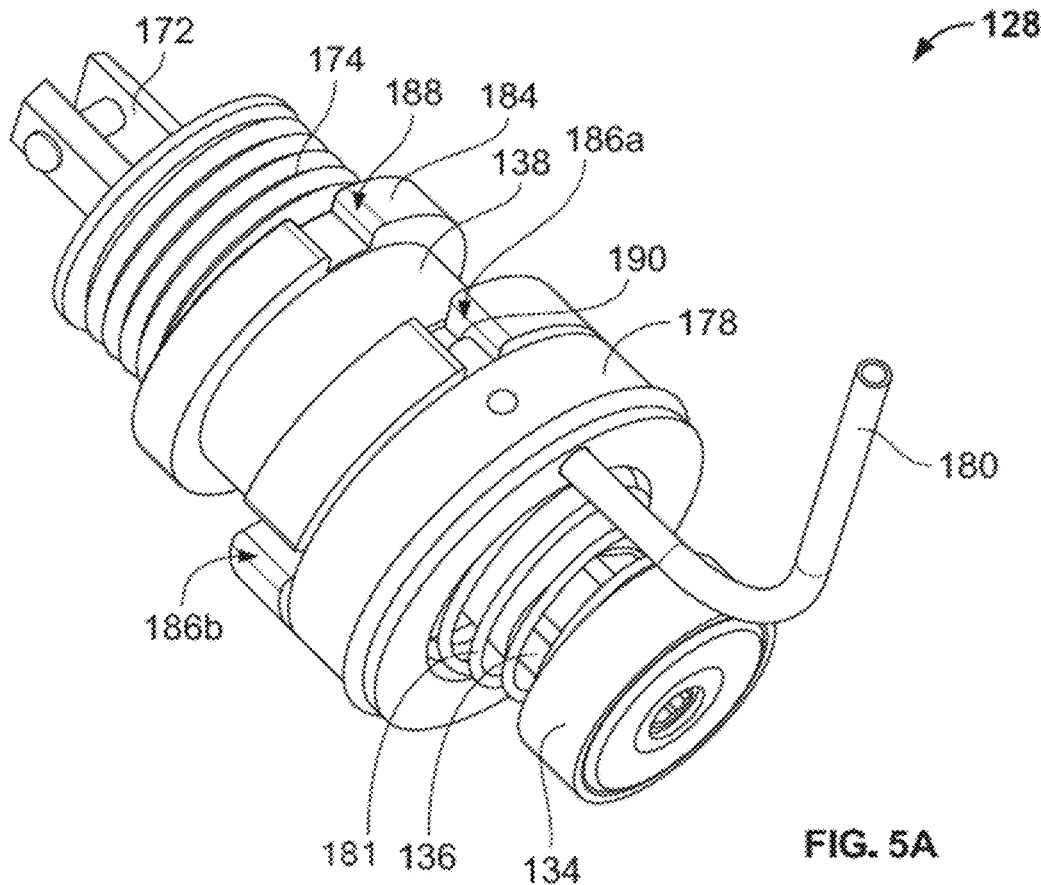
FIGS. 5A-5C are perspective views of the example plug assembly of FIG. 1 showing an example sequence of adjusting a position of the example tube of the example plug assembly.
Figure 5B:
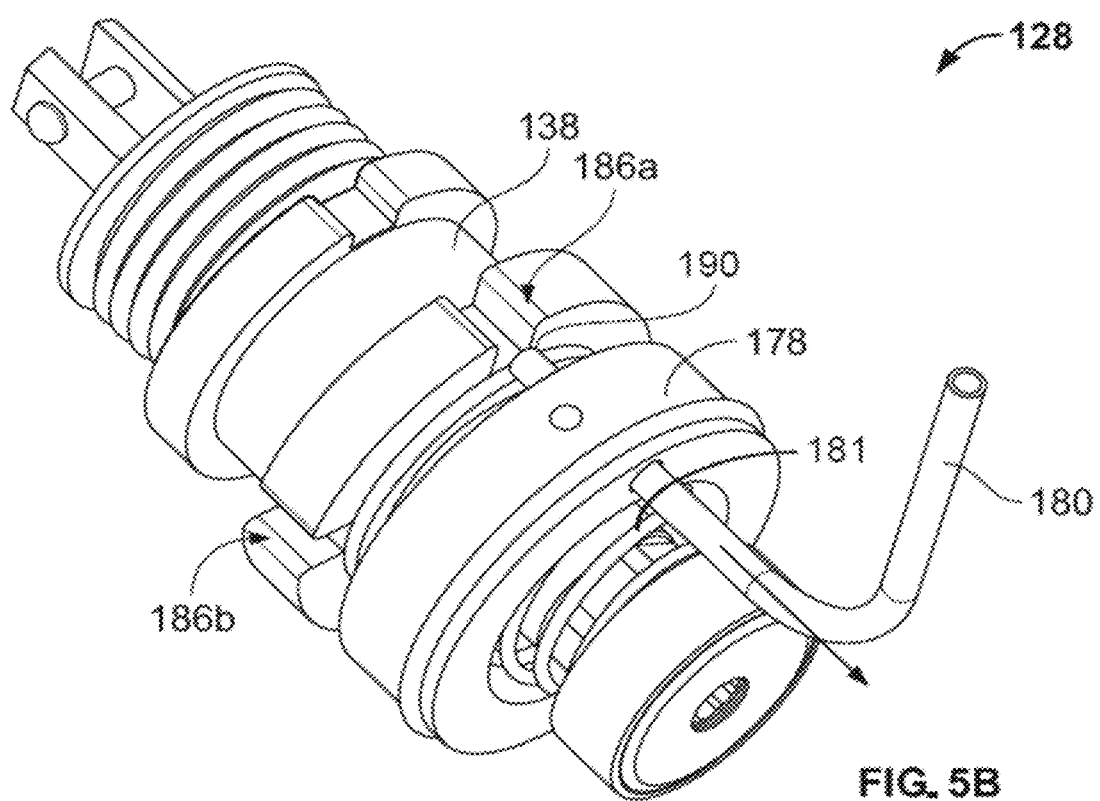
Figure 5C:
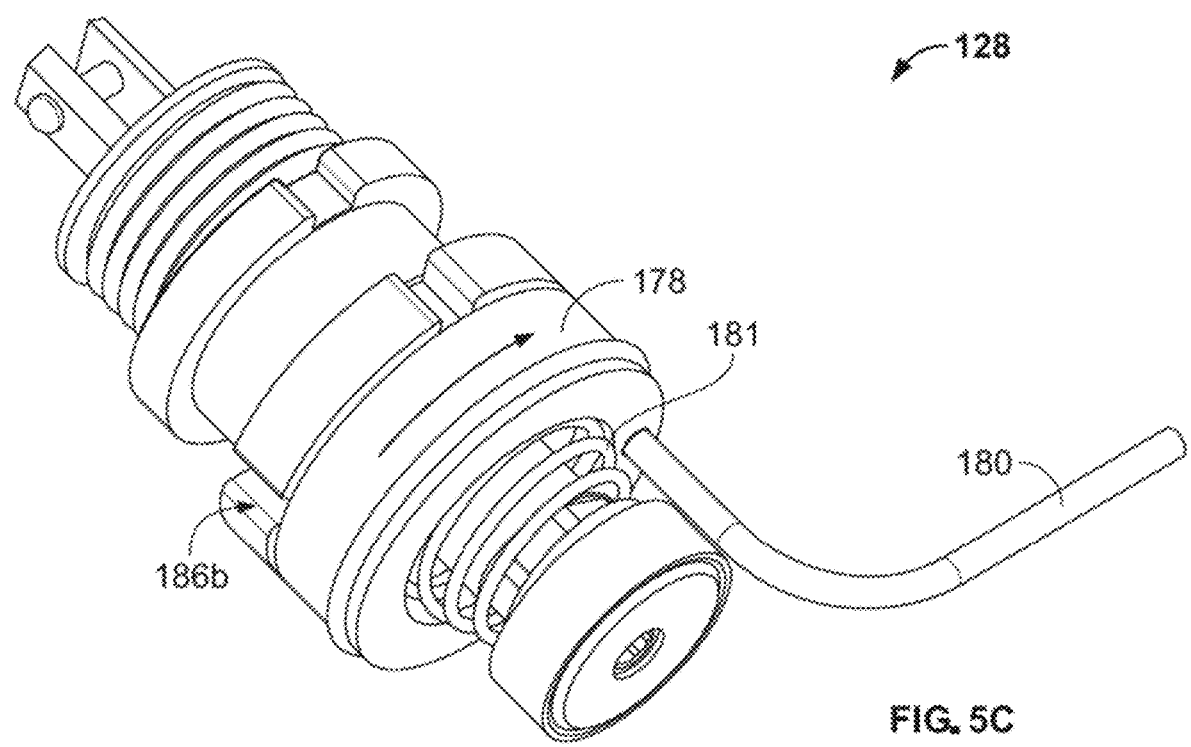

FIGS. 5A-5C are perspective views of the plug assembly 128 showing an example sequence of adjusting the orientation of the tube 180. In FIG. 5A, the boost body 178 is engaged or sealed against the stem guide 138 and the first end 190 of the tube 180 is disposed in the first notch 186a. In this position, the tube 180 extends outward and vertically upward. Also shown and labeled in FIG. 5A are the notch 188 in the second flange 184 of the stem guide 138, the return spring 174, the stem 136, the stem pin 172, and the plug 134.

To change the orientation of the boost body 178 and the tube 180, the boost body 178 can be moved away from the stem guide 138, against the bias of the spring 181. For example, as shown in FIG. 5B, the boost body 178 can be pulled linearly away (in the direction of the arrow) from the stem guide 138 such that the first end 190 of the tube 180 is moved out of the first notch 186a. In some examples, an installer (e.g., a person) can manually pull the boost body 178 away from the stem guide 138. Then, as shown in FIG. 5C, the boost body 178 with the tube 180 can be rotated (e.g., clockwise or counter-clockwise) to align the tube 180 with another notch 186b-186d. When the tube 180 is in the desired orientation and aligned with one of the notches 186a-186d, the boost body 178 can be released, and the spring 181 biases the boost body 178 toward the stem guide 138 such that the first end 190 of the tube 180 is inserted into the corresponding notch. The spring 181 ensures the parts stay together as intended by the installer during installation. Therefore, the boost body 178 is rotatable with respect to the stem guide 138 to position the tube 180 in at least one other orientation relative to the actuator casing 110 (FIG. 1). In this example, the boost body 178 and the tube 180 can be rotated to one of four positions or orientations to align the first end 190 of the tube 180 with one of the four notches 186*a*-186*d*. In this example, a portion of the tube 180 extends into the corresponding notch 186*a*-186*d*. Therefore, the tube 180 acts as a locating or indicating pin to align the tube 180 in one of the four positions. Once the tube 180 is in the desired orientation, the valve body 108 (FIG. 1) can be installed on the actuator casing 110 (FIG. 1) (or vice versa). As such, the orientation of the tube 180 can be changed while the plug assembly 128 remains in the channel 124 of the actuator casing 110.

In this example, the four notches 186*a*-186*d* are radially spaced apart from each other around the first flange 182. In particular, in this example, the notches 186*a*-186*d* are spaced 90° apart from each other. As such, the tube 180 can be rotated and positioned at one of four different rotational positions that are 90° apart. These four rotational positions correspond to the rotational positions in which the valve body 108 and the actuator casing 110 can be coupled, as shown in FIGS. 2A-2D. However, in other examples, the stem guide 138 can include more or fewer notches and/or the notches can be spaced apart at other increments (e.g., 6 notches spaced apart at 60° increments).

In some examples, the plug assembly 128 is sized and shaped to fit in existing pressure regulators. Therefore, old plug assemblies can be removed and replaced with the example plug assembly 128 with the tube 180.

Figure 6:
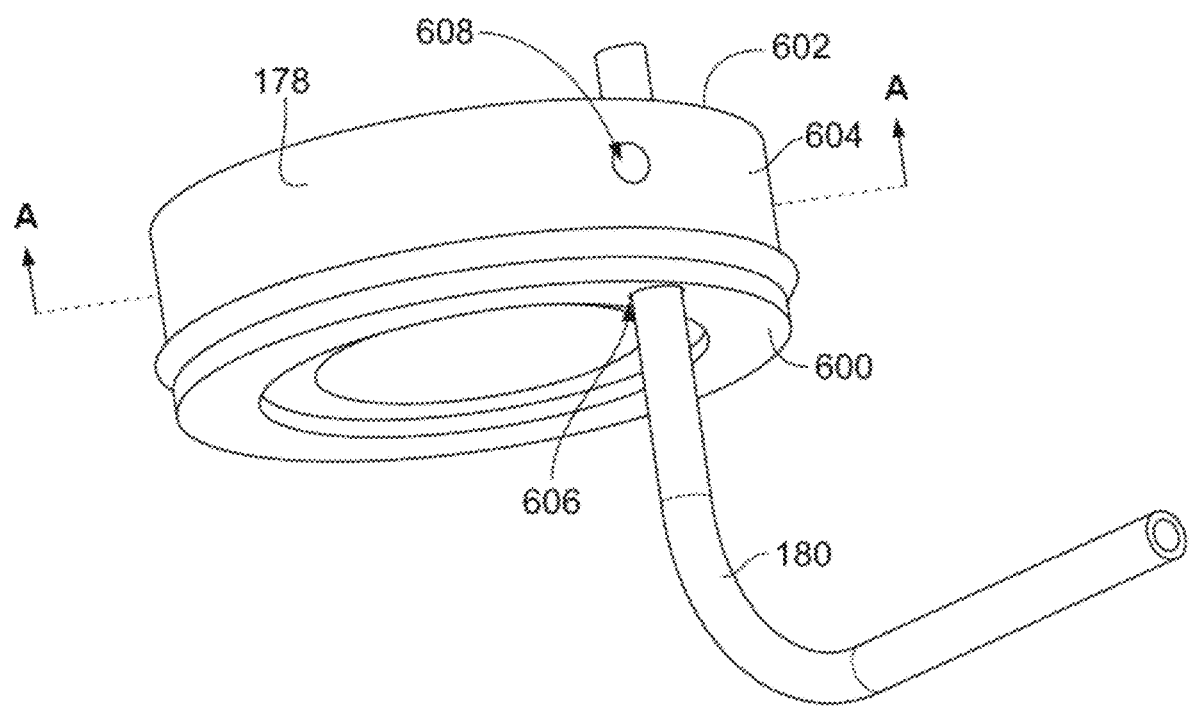
FIG. 6 is a perspective view of the example boost body and the example tube of the example plug assembly of FIG. 1.

FIG. 6 is a perspective view of the boost body 178 and the tube 180. The boost body 178 has a first side 600, a second side 602, and a peripheral edge 604 between the first side 600 and the second side 602. The tube 180 extends through a channel 606 formed between the first and second sides 600, 602 of the boost body 178. In some examples, the tube 180 and the channel 606 may be dimensioned such that the tube 180 fits snuggly (e.g., forms an interference fit (sometimes referred to as a friction fit or press fit)) within the channel 606 to prevent fluid leaking through the channel 606. For example, the diameter of the tube 180 may be larger than the diameter of the channel 606 prior to insertion into the channel 606. In some examples, the boost body 178 is constructed of a compliant material, such as rubber, and the tube 180 is constructed of metal, such as stainless steel.

Figure 7:
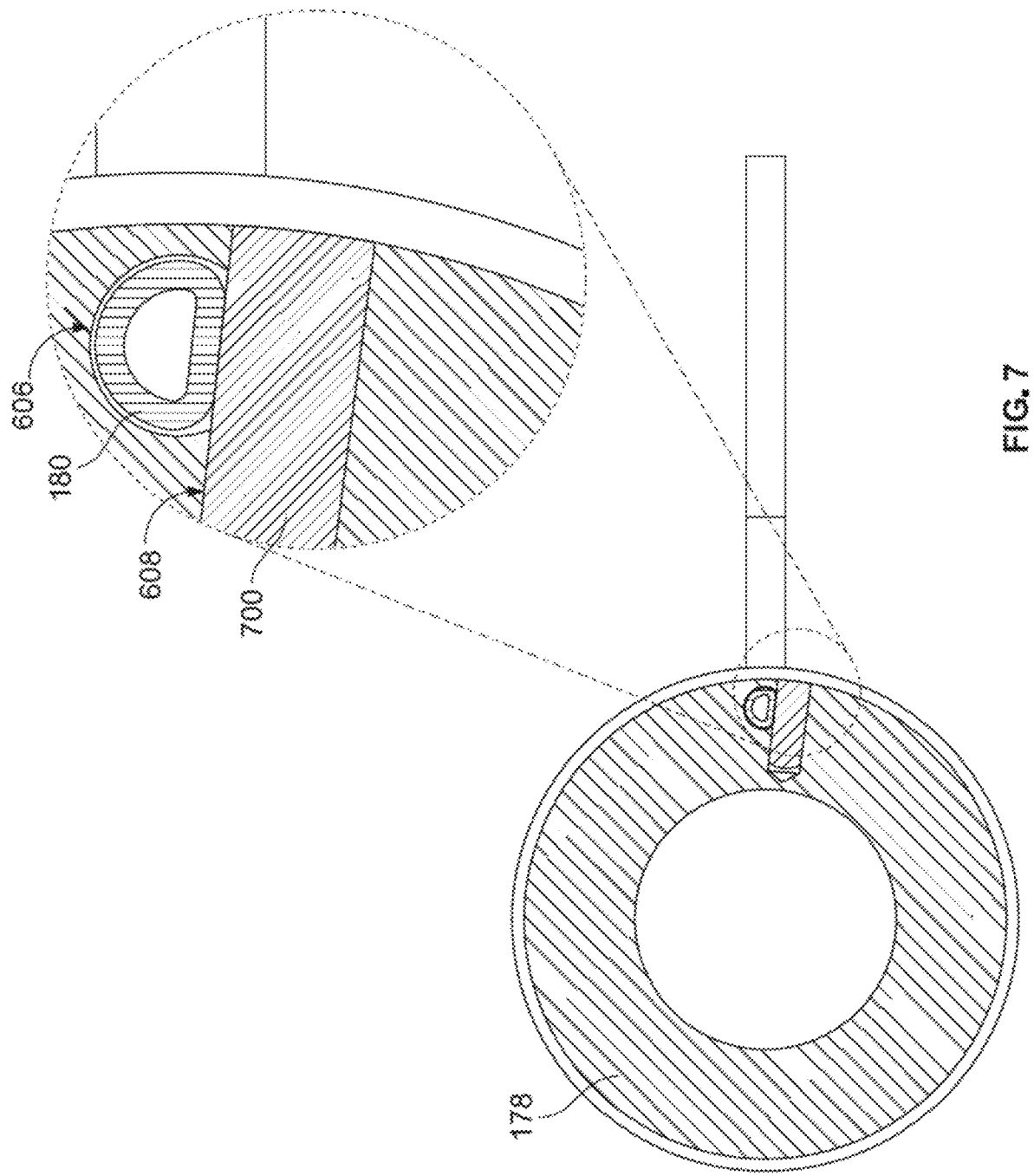
FIG. 7 is a cross-sectional view taken along line A-A of FIG. 6.

In this example, the tube 180 is coupled to the boost body 178 by a retaining pin. For example, FIG. 6 shows a bore 608 extending into the peripheral edge 604 of the boost body 178. The bore 608 partially intersects the channel 606. For example, FIG. 7 is a cross-sectional view of the boost body 178 taken along line A-A of FIG. 6. As shown in the callout in FIG. 7, a pin 700 is inserted into the bore 608. When the pin 700 is inserted into the bore 608, the pin 700 partially crushes or flattens a portion of the tube 180, as shown in the callout. This locks and/or otherwise prevents the tube 180 from being pulled out of the boost body 178. To remove the tube 180 from the boost body 178, the pin 700 is removed first, and then the tube 180 can be slid outward from the channel 606. In other examples, the tube 180 can be coupled to the boost body 178 via other techniques (e.g., a clamp, a threaded fastener). Further, in some examples, the boost body 178 and the tube 180 can be constructed (e.g., machined) as a single unitary part or component (e.g., a monolithic structure). As used herein, a unitary structure is defined as a structure that is monolithic.

In the example of FIG. 7, the tube 180 is held in place by the pin 700 in the boost body 178. While friction between the pin 700 and the boost body 178 tends to resist movement of the pin 700 relative to the boost body 178, the tube 180 is not prevented from, for example, rotating a small amount relative to the pin 700 and, thus, the boot body 178. Additionally, when the tube 180 is compressed by the pin 700 in the assembly process, the pressure from the pin 700 can cause the tube 180 to move relative to the boost body 178. Still further, when the tube 180 and the boost body 178 are separately manufactured parts, the assembly requires the machining of the boost body 178 (e.g., the plate), the bending of the tube 180, and the installation of the tube 180 and the pin 700 into the boost body 178. Constructing the example tube 180 and the example boost body 178 as a unitary piece eliminates the need for the pin 700 of FIG. 7, the related assembly operations and, advantageously, the possibility of movement (e.g., rotation) of the pin 700 relative to the boost body 178 such as mentioned above.

In some examples described herein, the tube 180 and boost body 178 assembly may be formed using additive manufacturing (i.e., 3-D printing). When the boost body 178 (e.g., the plate) and the tube 180 are printed as a single, unitary piece, the assembly requires less machining because the channel 606 and the bore 608 are eliminated.

Figure 8:
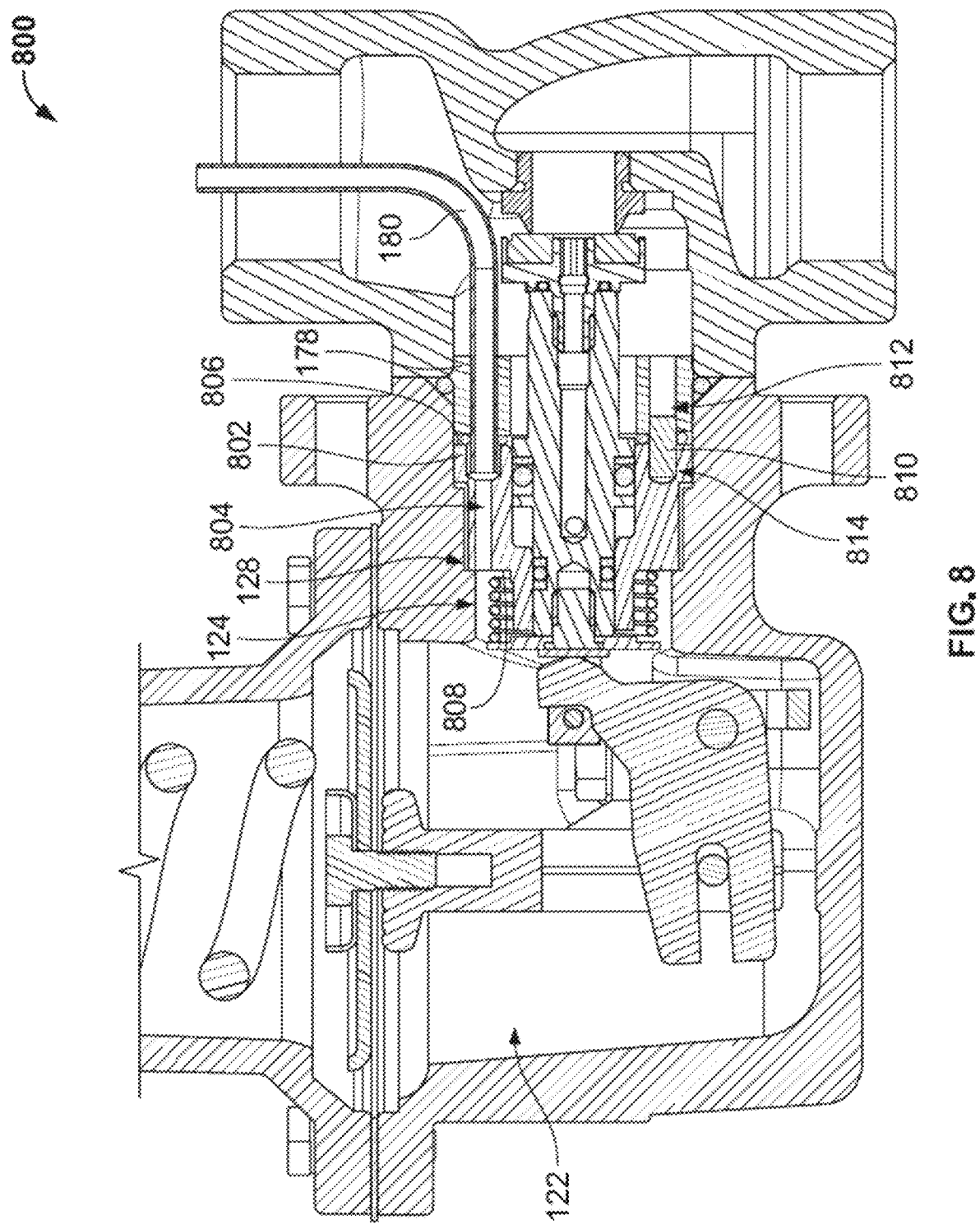
FIG. 8 is another example pressure regulator with an example pressure regulator having a different stem guide and boost body configuration.

FIG. 8 is a cross-sectional view of another example pressure regulator 800. The example pressure regulator 800 is similar to the example pressure regulator 100 disclosed above, and like parts will be given like numbers. However, in this example, the plug assembly 128 includes a stem guide 802 that is different than the stem guide 138 disclosed above. In this example, the stem guide 802 has one channel 804 between a first side 806 and a second side 808 of the stem guide 802. The tube 180 extends into the channel 804. As such, fluid from the tube 180 is routed through the stem guide 802 to the pressure sense chamber 122.

Figure 9:
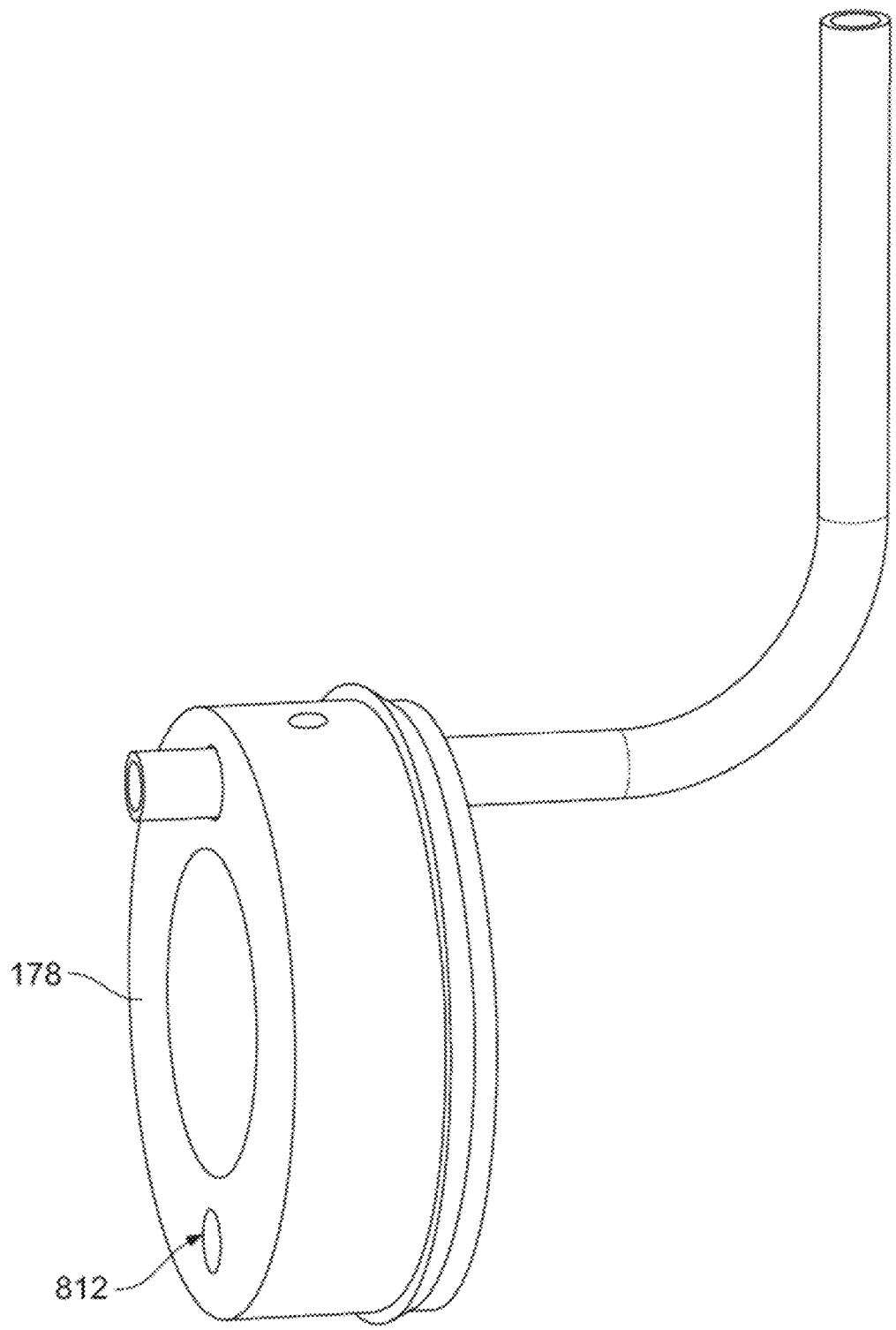
FIG. 9 is a perspective view of the example boost body and example tube of the example plug assembly of FIG. 8.

In the example of FIG. 8, the boost body 178 and the stem guide 802 are coupled by a pin 810. In particular, the boost body 178 has an opening 812, and the stem guide 802 has a bore 814. The pin 810 is disposed in the opening 812 of the boost body 178 and extends into the bore 814. As such, because both the tube 180 and the pin 810 extend into the stem guide 802, the boost body 178 and the stem guide 802 are rotationally locked. In other words, the boost body 178 is not rotatable relative to the stem guide 802 like the example of FIG. 1. Instead, to change the orientation of the tube 180, the entire plug assembly 128 can be removed from the channel 124, rotated, and then reinserted into the channel 124 in the desired orientation. FIG. 9 is a perspective view of the boost body 178 of FIG. 8 showing the opening 812 in the boost body 178.

Figure 10A:
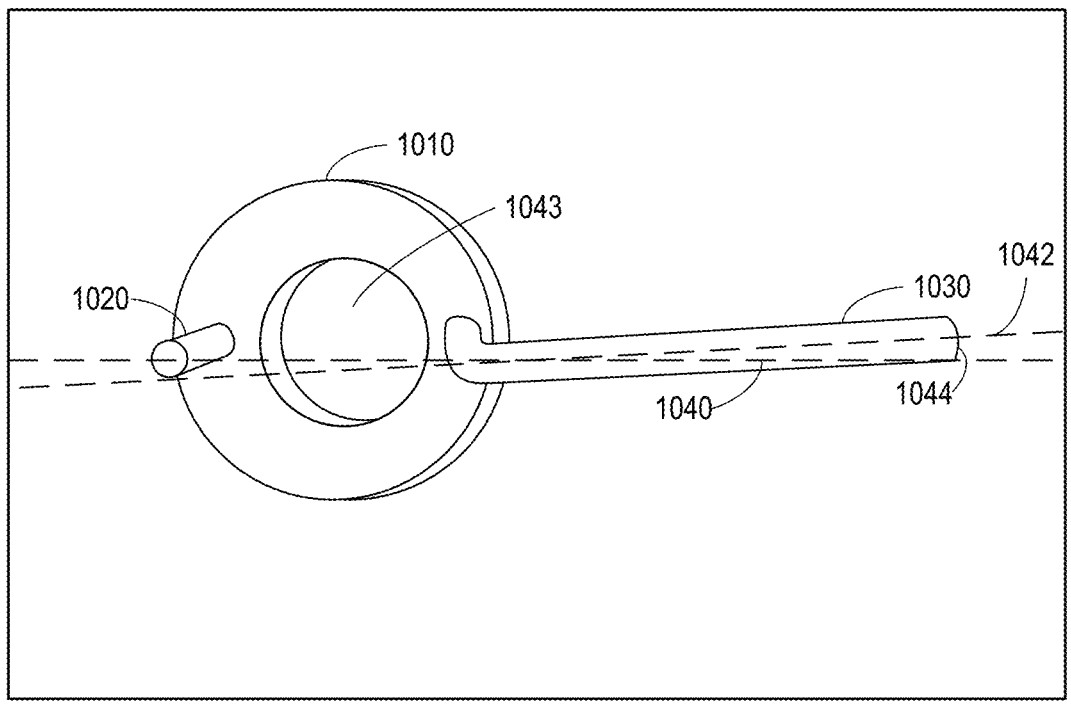
FIGS. 10A-10B depict an example boost body, an example tube, and an example locating pin.
Figure 10B:
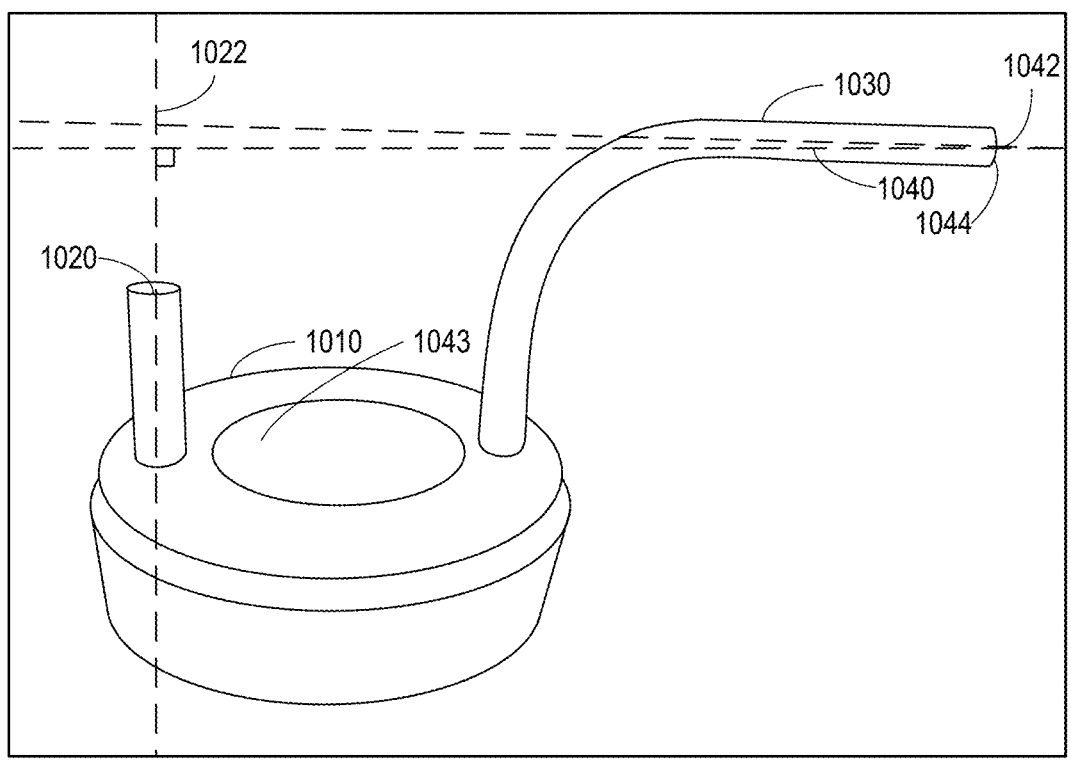

FIGS. 10A-10B depict an example boost body 1010, an example locating pin 1020, and an example tube 1030. In the example of FIGS. 10A-10B, the boost body 1010 and the tube 1030 are not unitary. In some examples, the boost body 1010 may be a separate piece or attached to the valve body 108 or the stem guide 138 (shown in FIG. 1). Further, in the example of FIGS. 10A-10B, the locating pin 1020 is only included for purposes of explaining various alignments of parts and is not used in implementations of the non-unitary assembly of FIGS. 10A-10B.

The position of the locating pin 1020 indicates (e.g., to a person adjusting the position of the tube 1030) the position or orientation of the tube 1030 relative to the boost body 1010 when a pin (e.g., the pin 700 of FIG. 7) is used to secure the tube 1030 in the boost body 1010. The position of the locating pin 1020, indicated by an axis or line 1040 extending through the center of the locating pin 1020 and the center of an opening 1043 of the boost body 1010, is intended to indicate the desired position of the tube 1030. However, as shown in the example of FIGS. 10A-10B, when a pin (e.g., the pin 700 of FIG. 7) is used to secure the tube 1030 in the boost body 1010, the tube 1030 may become skewed relative to the locating pin 1020. In the example of FIG. 10A, and as shown in FIG. 7, a pin (e.g., the pin 700 of FIG. 7) is used to secure the tube 1030 to the boost body 1010. A line 1042 represents the orientation of the tube 1030 after it has been secured by the pin. Specifically, the line 1042 represents the central longitudinal axis of an end 1044 of the tube 1030. As demonstrated by the difference (e.g., angular displacement or skew) between the line 1040 and the line 1042, using a pin to secure the tube 1030 to the boost body 1010 can cause the tube 1030 to move or skew. Because the tube 1030 is not properly aligned with the locating pin 1020 (i.e., the line 1042 is not coincident with the line 1040), the position of the locating pin 1020 no longer accurately indicates the downstream location or orientation of the tube 1030.

As shown in FIG. 10B, the pin (e.g., the pin 700 of FIG. 7) causes another angular offset or skew of the tube 1030. This angular offset is demonstrated, in the orientation of FIG. 10B, by the skew between the line 1040 and the line 1042. Further, in this view, the locating pin 1020 has a central longitudinal axis 1022 that intersects the line 1040 at a 90 degree angle (i.e., is perpendicular to the line 1040). As demonstrated in FIG. 10B, the line 1042 does not intersect at a 90 degree angle with the axis 1022. Therefore, because the pin skews the position of the tube 1030 with respect to the boost body 1010, the locating pin 1020 does not accurately represent the downstream position of the tube 1030.

Figure 11:
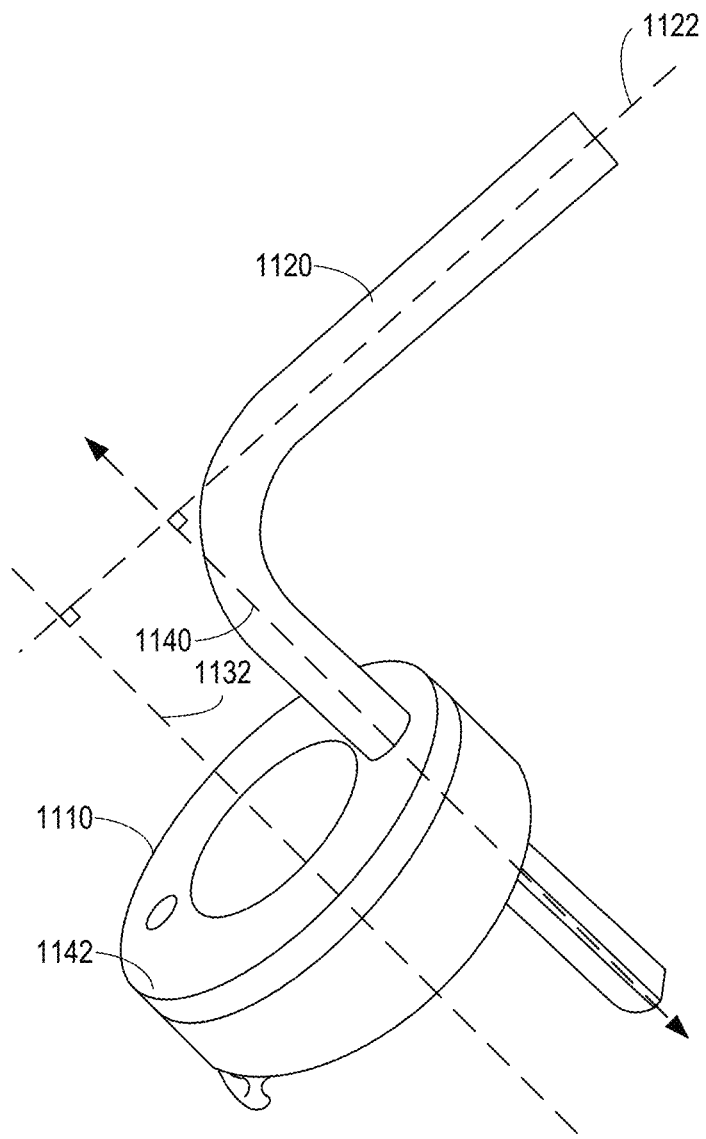
FIGS. 11-12 depict example unitary tube and boost body structures.

FIG. 11 is an example implementation of a unitary structure in accordance with the teachings herein. In the example of FIG. 11, a boost body 1110 and a tube 1120 form the unitary structure. In FIG. 11, the tube 1120 has a first longitudinal axis 1140 that is perpendicular to a surface 1142 of the boost body 1110. In other words, the tube 1120 is perpendicular to the surface 1142 at the point it intersects surface 1142. Further, the first longitudinal axis 1140 of the tube 1120 is parallel to a longitudinal axis 1132 through the center of the boost body 1110. As a result of the unitary formation of the boost body 1110 and the tube 1120, a second longitudinal axis 1122 of the tube 1120 intersects the longitudinal axes 1132, 1140 at a 90 degree angle (i.e., the second longitudinal axis 1122 is perpendicular to the axes 1132 and 1140).

Figure 12:
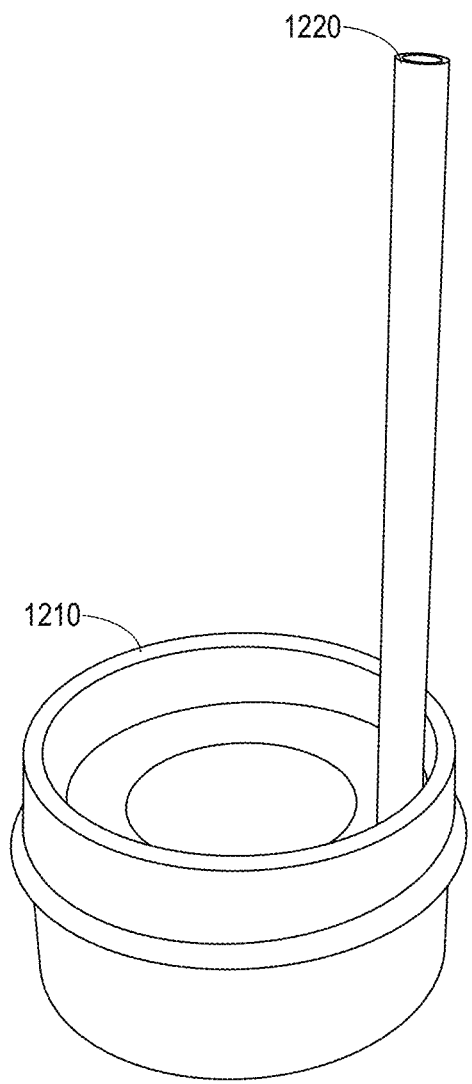

FIG. 12 is a further example implementation of a unitary structure in accordance with the teachings herein. In the example of FIG. 12, a boost body 1210 and a tube 1220 form the unitary structure. In the example of FIG. 12, the tube 1220 is straight and, thus, not curved. The straight tube 1220 is easier to machine. Then during installation, the tube 1220 may be bent or curved based on the installation conditions and/or application. In some examples, the tube 1220 may be comprised of 316L stainless steel, titanium, 17-4 stainless steel, and other metal-printed material. Further, the tube 1220 may be comprised of any material that resists corrosion and is sufficiently ductile to enable forming (e.g., bending) in the field during installation. In some examples, the tube 1220 may be bent using a tool (e.g., a tubing bender or other suitable tool to bend the tube). Further, in some examples, the tube 1220 may be bent by hand when performing installation.

Figure 13:
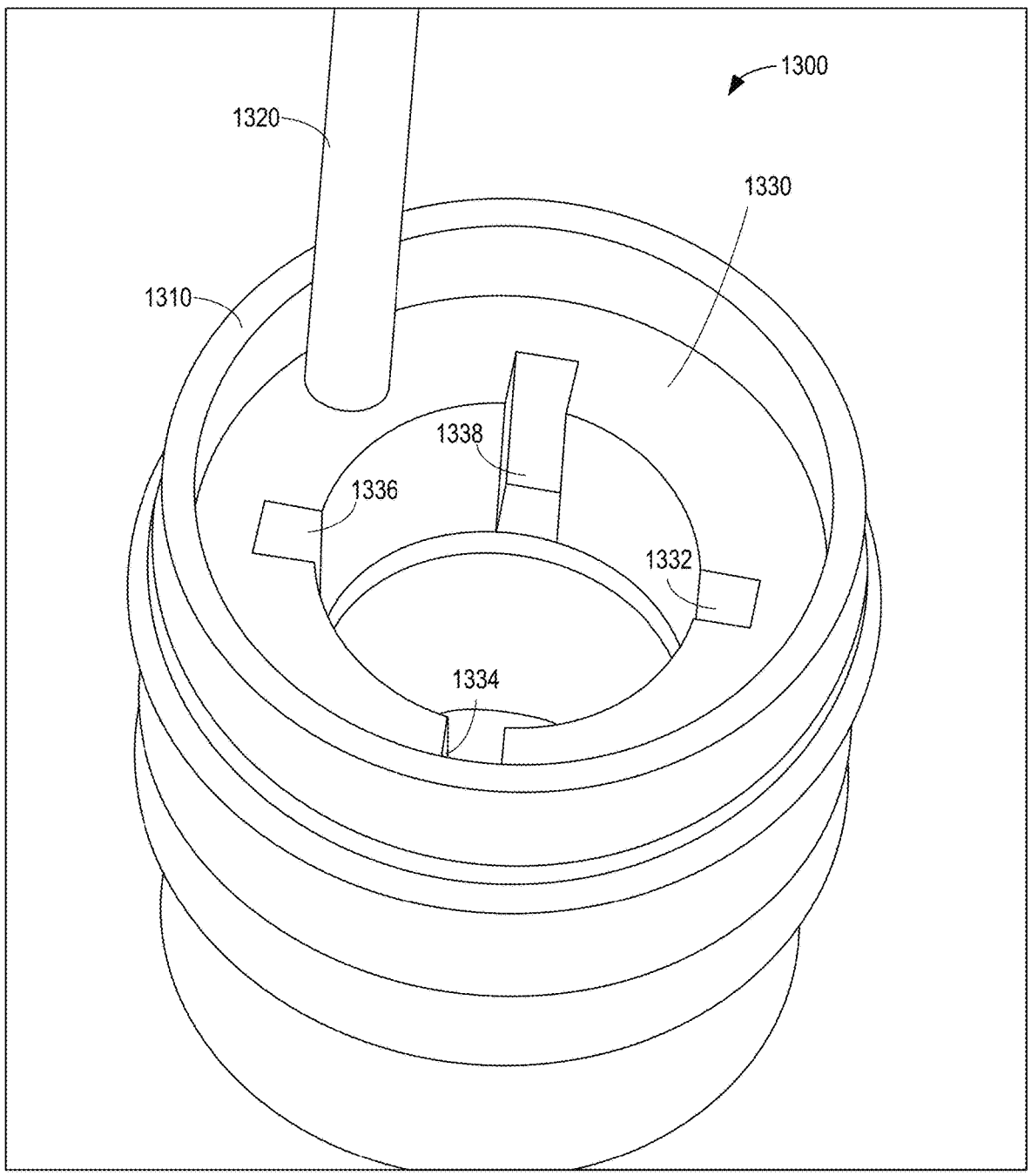
FIG. 13 is an example unitary tube, boost body, and stem guide.

FIG. 13 is an example of an adjustable tube assembly 1300 with a boost body 1310, a tube 1320, and a stem guide 1330. In this example, the adjustable tube assembly 1300 is a unitary structure. In this example, the stem guide 1330 has four notches 1332, 1334, 1336, 1338. In some examples, the stem guide 1330 may have one notch, two notches, three notches, or more than four notches. In some examples, the unitary structure 1300 shown in FIG. 13 may be combined with other pieces of the pressure regulator in addition to the boost body 1310 (e.g., valve body, actuator casing, etc.) to further simplify manufacturing the assembly.

Figure 14:
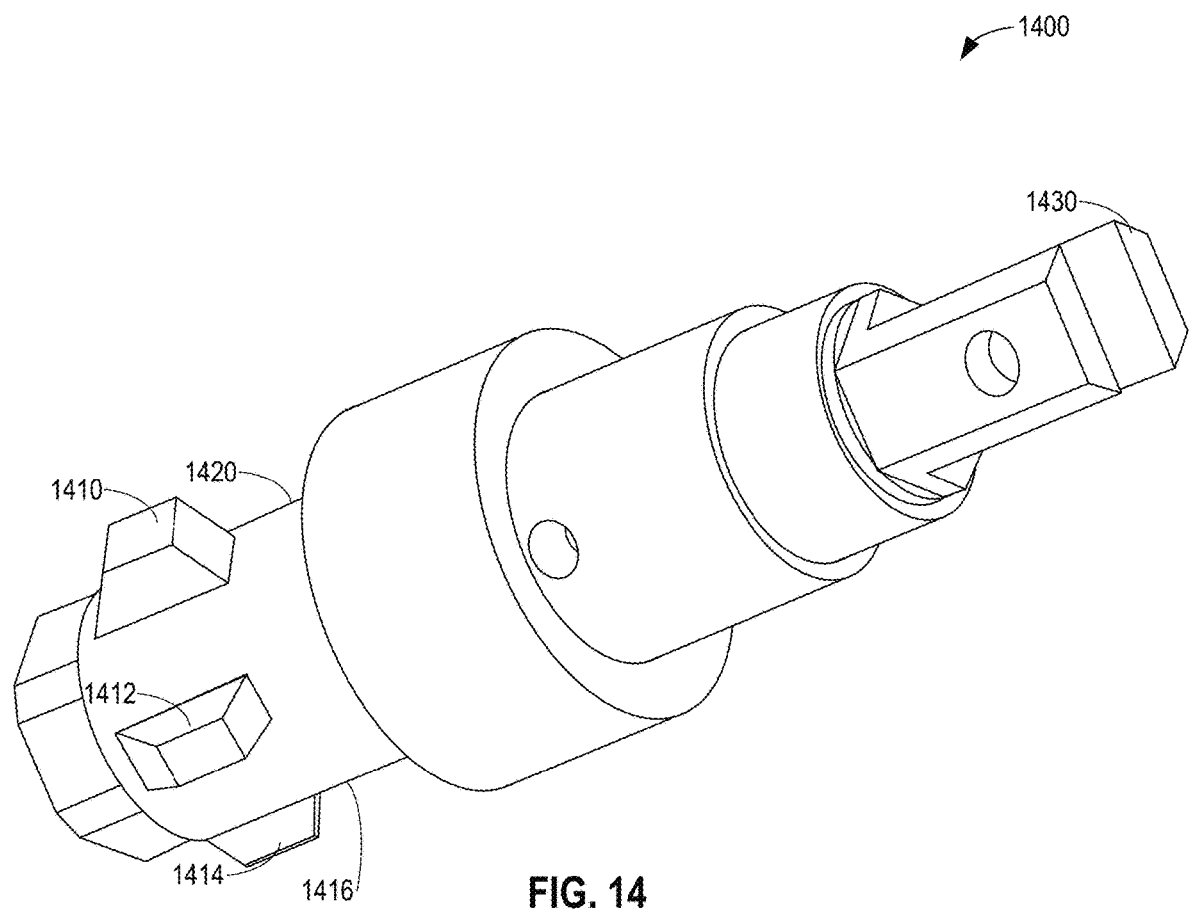
FIG. 14 is an example key for use with the example of FIG. 13.
Figure 15:
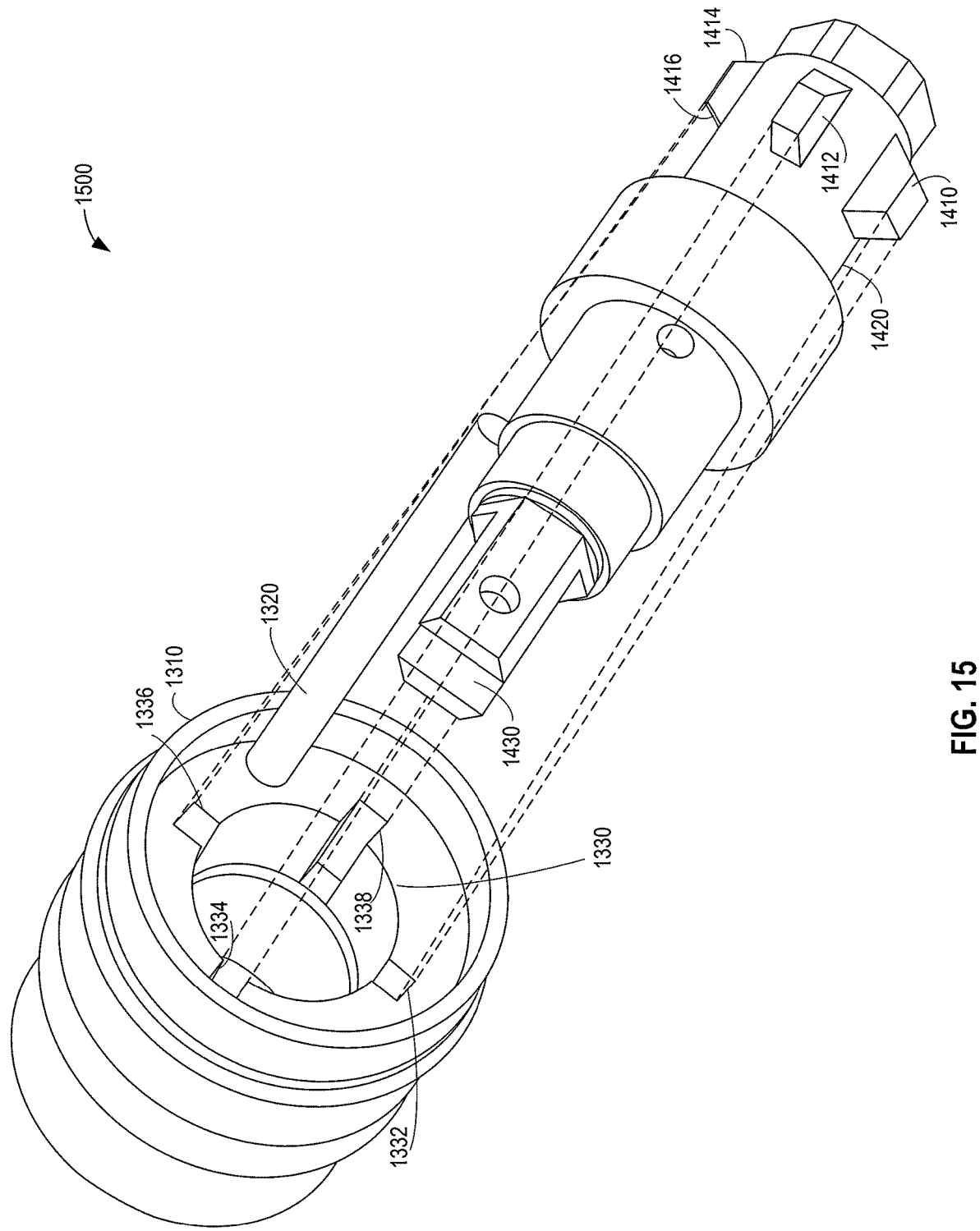
FIG. 15 is an example implementation of the example unitary tube, boost body, and stem guide of FIG. 13 and the example key of FIG. 14.

A non-unitary assembly of the parts of FIG. 13 relies on friction between the boost body 178 and the valve body 108 to prevent rotation of the non-unitary assembly relative to the lever 170. Instead, in the example of FIG. 13, the adjustable tube assembly 1300 may be keyed so that rotation of the assembly 1300 depends on the fit between a key 1400, described in more detail in connection with FIG. 14, and the notches 1332, 1334, 1336, 1338 of the stem guide 1330. In some examples, the notches 1332, 1334, 1336, 1338 may be added to the interior sides of stem guide 1330 and offset relative to the tube 1320. The notches 1332, 1334, 1336, 1338 on the interior of the stem guide 1330 allow key teeth, projections, or tabs 1410, 1412, 1414, 1416 of a keyed stem 1420 (as shown in FIG. 14) to be inserted into the adjustable tube assembly 1300, as shown in FIG. 15. In some examples, the notches 1332, 1334, 1336, 1338 may be curved for ease of manufacture.

FIG. 14 is detailed view of the example key 1400 to key the orientation of the adjustable tube assembly 1300. As used herein, keying is the process by which an installer may change the position or orientation of the tube 1320 and the stem guide 1330 (i.e., the attached boost body 1310) relative to the lever 170 and the valve body 108. In some examples, the key 1400 may have one key projection, two key projections, three key projections, or more than four key projections. Further, the key projections 1410, 1412, 1414, 1416 may be of varying shapes and sizes to correspond with the adjustable tube assembly 1300. Further, in this example, the connection 1430 connects the key 1400 to the lever 170.

FIG. 15 is an example implementation 1500 of the key 1400 keying the adjustable tube assembly 1300. As described above, keying changes the orientation of the tube 1320 relative to the lever 170 and the valve body 108. Keying is the process by which the boost body is separated from the key 1400, rotated to a position (i.e., a predetermined orientation) relative to the key 1400 based on the position of the key units of the tool in relation to the notches 1332, 1334, 1336, 1338 of the boost body (i.e., stem guide), and returned to mate with the key 1400 in the aligned position. As shown in FIG. 15, a yoke 1430 is inserted through the stem guide 1330 so that the key projections 1410, 1412, 1414, 1416 may mate with corresponding ones of the notches 1332, 1334, 1336, 1338. In the example of FIG. 15, the boost body 1310 may be rotated clockwise in 90 degree increments to adjust the location of the tube 1320 relative to the lever 170. However, in other examples, the stem guide 1330 may be configured to rotate in increments of more or less than 90 degrees and/or may be configured to in unequal increments that are more or less than 90 degrees.

For example, while in this example the notches 1332, 1334, 1336, 1338 are spaced 90 degrees apart to facilitate various 90 degree orientations of the tube 1320, the notches 1332, 1334, 1336, 1338 may be spaced any distance apart to orient the tube 1320 in other increments (i.e., 45 degree increments, 100 degree increments, etc.). Further, the notches 1332, 1334, 1336, 1338 can be spaced in any increment relative to each other.

FIGS. 16A-21B are various example implementations of a unitary tube and boost body. The examples illustrated herein are non-exhaustive of possible unitary assemblies. Additionally, various implementations may have different tube diameters, tubes with different curves, tubes with different lengths, or assemblies composed of different materials.

Figure 16A:
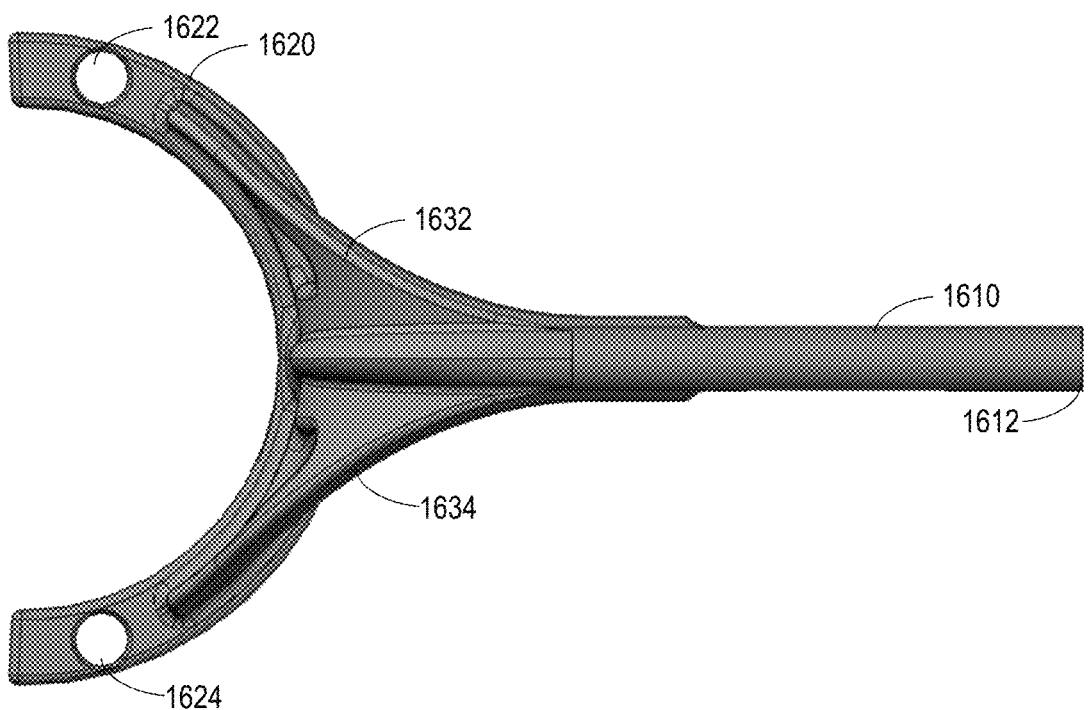
FIGS. 16A-21B are additional example unitary tube and boost body components.
Figure 16B:
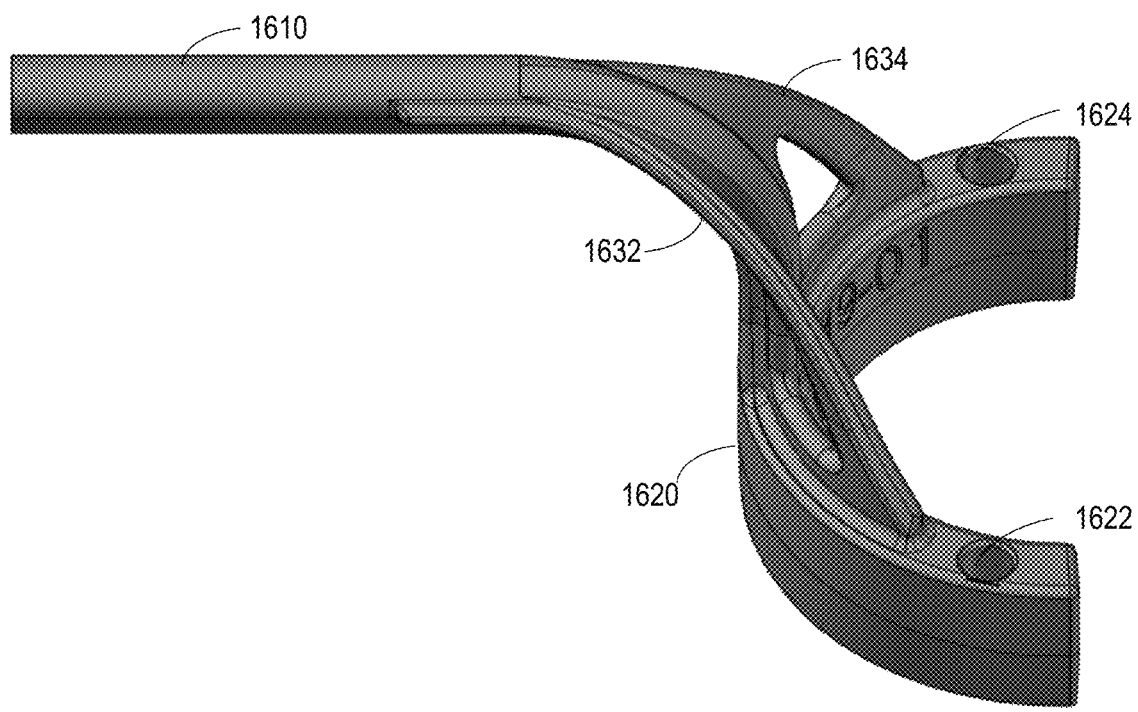

FIGS. 16A-16B are perspective views of an example implementation of a unitary tube 1610 and boost body 1620. While not shown in the example of FIGS. 16A-16B, the example tube 1610 continues from the bottom side of the boost body 1620, similar to as shown in FIG. 11A. Therefore, in this implementation, the tube 1610 connects into the boost body 178 and provides fluid path therethrough. In this example, a portion of the tube 1610 is supported by a first arm 1632 of the boost body (i.e., the boost body 1620) and a second arm 1634 of the boost body (i.e., the boost body 1620). Further, in some examples, the first arm 1632 and the second arm 1634 of the boost body (i.e., the boost body 1620) are unitary with the boost body (i.e., the boost body 1620) and the tube 1610. In this example, the arms 1632 and 1634 are gussets or web-like structures that provide support (e.g., strength and rigidity) to the tube 1610. However, the arms 1632 and 1634 may have other shapes, geometries, etc. to provide the same or a similar function. While there are two arms 1632, 1634 shown in this example, in other implementations there may be one arm or more than two arms. In this example, the boost body 1620 has two holes 1622, 1624 that may be utilized to fasten the boost body 1620 to the boost body 178. In other examples, one hole or more than two holes may be utilized to fasten the boost body 1620 to the boost body 178. In some examples, the arms 1632, 1634 may be manufactured using a separate additive manufacturing process than the process to unify the tube 1610 and the boost body 1620. The separate additive manufacturing process may be employed to print parts on a previously machined piece. In this example, the boost body 1620 has a semicircular shape. However, in other examples, the boost body 1620 may be any other suitable shape (e.g., a circle, an ellipse, an oval, a polygon, etc.). In this example, an end 1612 of the tube 1610 extends away from the boost body 1620. However, in other examples, the tube 1610 may be formable in a different direction, or, additionally or alternatively, extend in a direction other than that depicted in FIGS. 16A-16B. In this example, the tube 1610 emerges from the midpoint of the semicircular boost body 1620. In other examples, the tube 1610 may emerge from another location along the boost body 1620. While FIGS. 16A-16B depict one tube 1610, more than one tube may be utilized in other implementations.

Figure 17A:
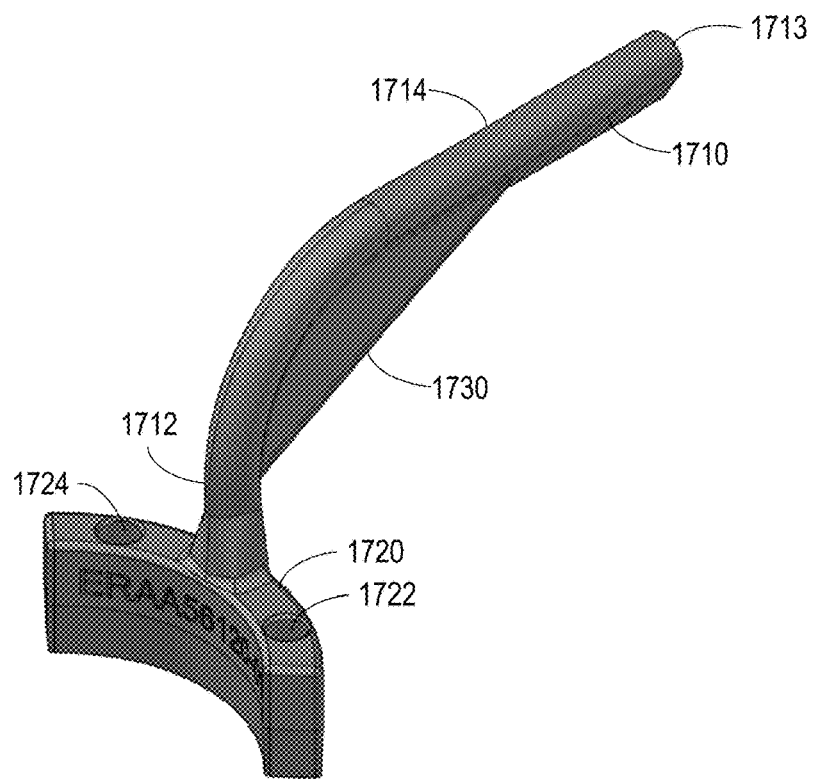
Figure 17B:
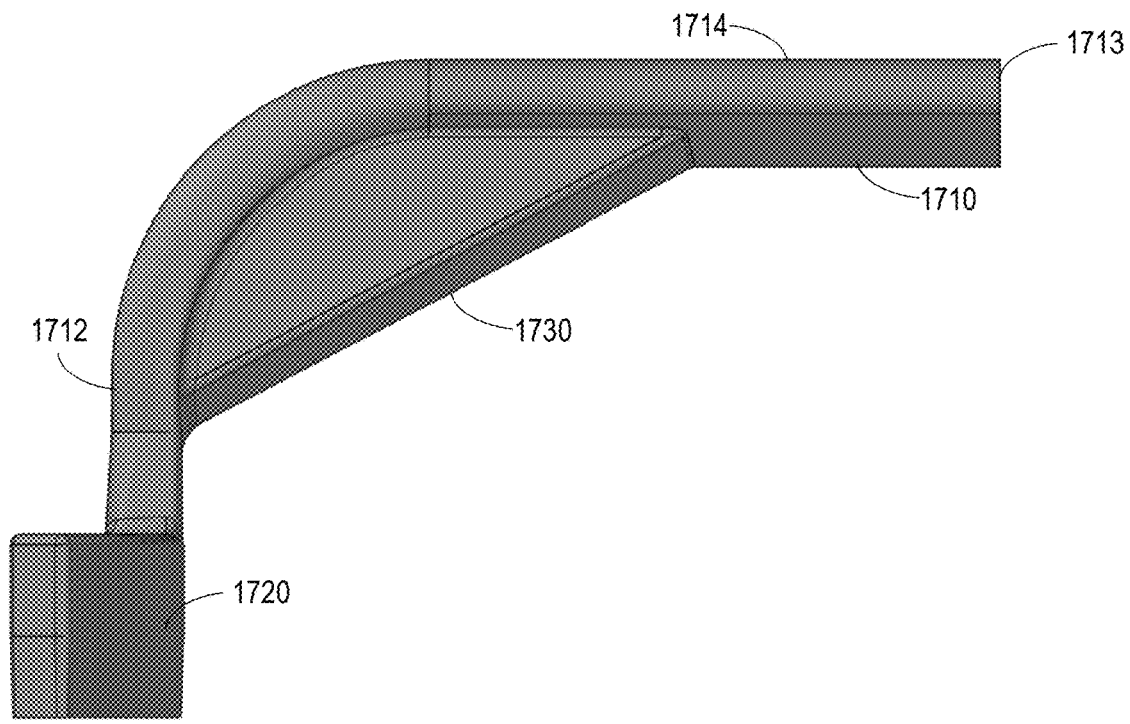

FIGS. 17A-17B are perspective views of an example implementation of a unitary assembly of an example tube 1710 and an example boost body 1720. While not shown in the example of FIGS. 17A-17B, the example tube 1710 continues from the bottom side of the boost body 1720, similar to as shown in FIG. 11A. Therefore, in this implementation, the tube 1710 connects into the boost body 178. In this example, a portion of the tube 1710 is curved to form a first portion 1712 and a second portion 1714, the first portion 1712 is nearest to the boost body (i.e., nearest to the boost body 1720) and the second portion 1714 is nearest to an end 1713 of the tube 1710. A fillet or web 1730 connects the first portion 1712 and the second portion 1714. In this example, the fillet 1730, the first portion 1712, and the second portion 1714 form a unitary structure. In this example, the fillet 1730 is a web-like structure that provides structural support (e.g., strength and rigidity) to the tube 1710. However, the fillet 1730 may have other shapes, geometries, etc. to provide the same or a similar function. Further, in other examples, there may be more than one fillet to further support the tube 1710 (i.e., a fillet positioned between the boost body 1720 and the tube 1710). In this example, the boost body 1720 has two holes 1722, 1724 that may be utilized to fasten the boost body 1720 to the boost body 178. In other examples, one hole or more than two holes may be utilized to fasten the boost body 1720 to the boost body 178. In some examples, the fillet 1730 may be manufactured using a separate additive manufacturing process than the process to unify the tube 1710 and the boost body 1720. As mentioned above, the separate additive manufacturing process may be employed to print parts on a previously machined piece. In this example, the boost body 1720 is shaped as a partial ring. However, in other examples, the boost body 1720 may have any other suitable shape (e.g., a straight line, a circle, an ellipse, an oval, a square, etc.). In this example, an end of the tube 1712 points away from the boost body 1720. However, in other examples, the tube 1710 may be formable in a different direction, or, additionally or alternatively, pointed in a direction other than that depicted in FIGS. 17A-17B. In this example, the tube 1710 emerges from the midpoint of the boost body 1720. In other examples, the tube 1710 may emerge from another location along the boost body 1720. While FIGS. 17A-17B depict one tube 1710, more than one tube may be utilized in other implementations.

Figure 18A:
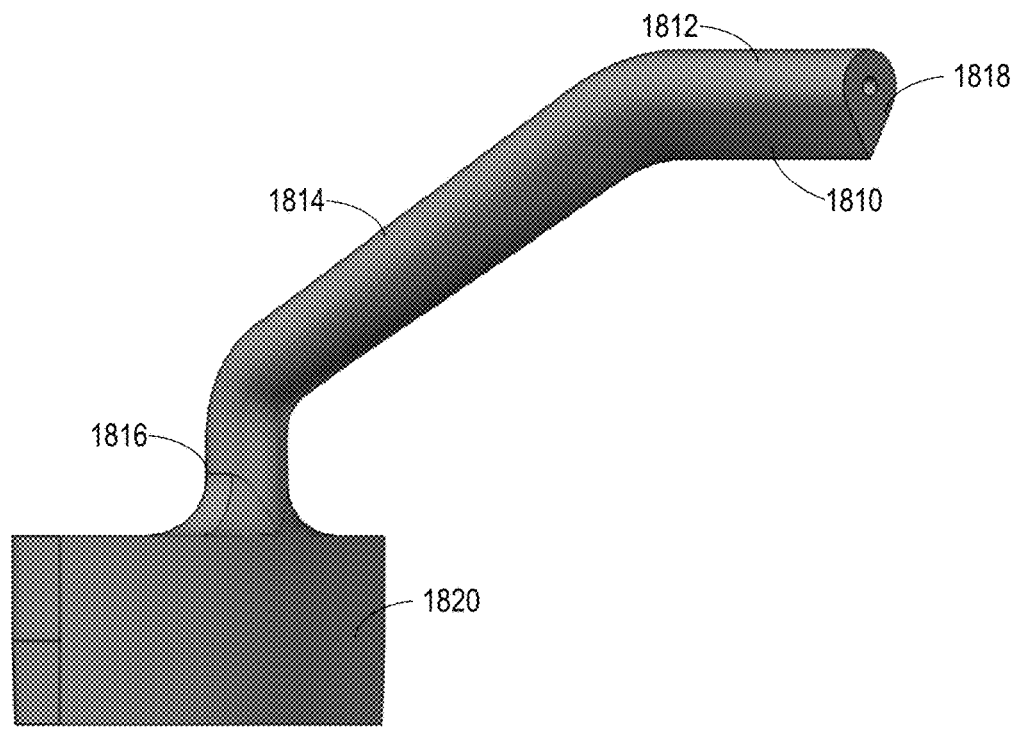
Figure 18B:
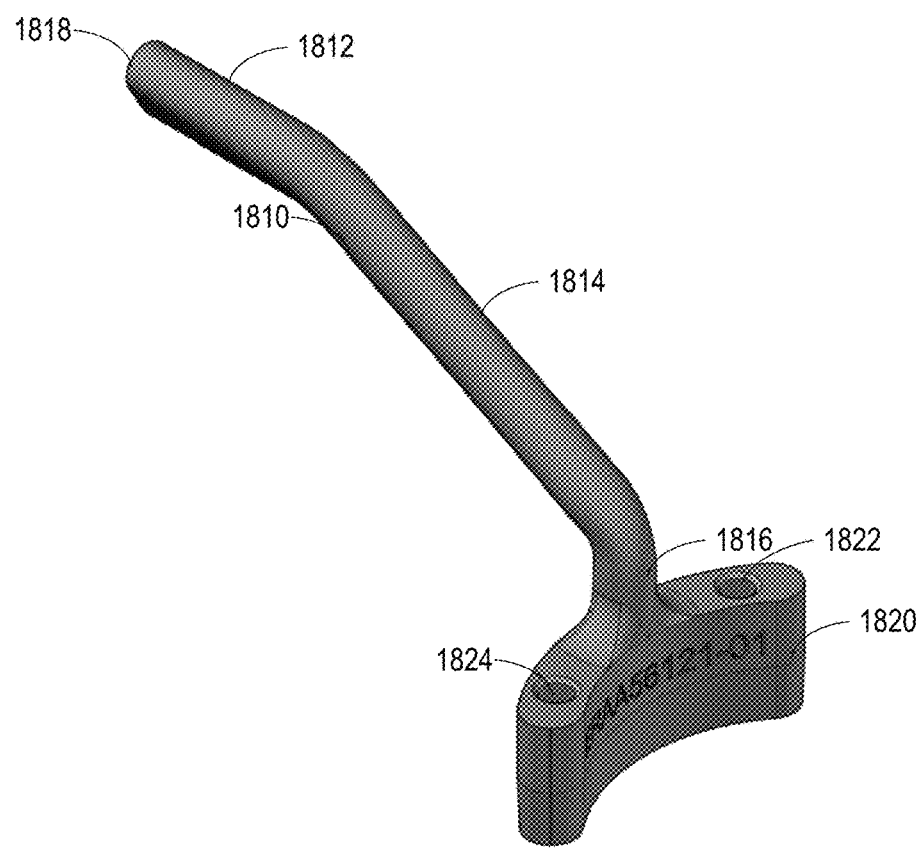

FIGS. 18A-18B are perspective views of an example implementation of a unitary assembly of an example tube 1810 and an example boost body 1820. While not shown in the example of FIGS. 18A-18B, the example tube 1810 continues from the bottom side of the boost body 1820, similar to as shown in FIG. 11A. Therefore, in this implementation, the tube 1810 connects into the boost body 178. In this example, a portion of the tube 1810 is bent or curved to form a first portion 1812, a second portion 1814, and a third portion 1816, wherein the first portion 1812 is at a first orientation, the second portion 1814 is at a second orientation different than the first orientation, and the third portion 1816 is at a third orientation different than the first and second orientations. In this example, the boost body 1820 has two holes 1822, 1824 that may be utilized to fasten the boost body 1820 to the boost body 178. In other examples, one hole or more than two holes may be utilized to fasten the boost body 1820 to the boost body 178. Additionally, in this example, the cross-section of the tube 1810 has a teardrop shape. The teardrop shaped cross-section is an aerodynamic shape that prevents disruption of the flow of the fluid through the tube 1810. While this example cross-section is shown in connection with the implementation of FIG. 18, it may be applied to any tube. Other suitable shapes and cross-sections may be used additionally with or alternatively to the teardrop shaped cross-section. In some examples, the portion of the tube attached to the boost body 1820 up until a first bend in the tube (i.e., the bend nearest to the boost body 1820) has a teardrop shaped cross-section, and then after the first bend, the tube 1810 has a circular cross-sectional shape. While in this example the tube 1810 is not supported by an arm or web, in other implementations the tube 1810 may be connected to the boost body 1820 by one or more arm(s) or web-like support structures of varying shapes and sizes. In this example, the boost body 1820 is shaped as a partial circle or ring. However, in other examples, the boost body 1820 may have any other suitable cross-sectional shape (e.g., a straight line, a circle, an ellipse, an oval, a square, etc.). In this example, the end of the tube 1818 points away from the boost body 1820. However, in other examples, the tube 1810 may be formable in a different direction, or, additionally or alternatively, pointed in a direction other than that depicted in FIGS. 18A-18B. In this example, the tube 1810 emerges from the midpoint of the boost body 1820. In other examples, the tube 1810 may emerge from another location along the boost body 1820. While FIGS. 18A-18B depict one tube 1810, more than one tube may be utilized in other implementations.

Figure 19A:
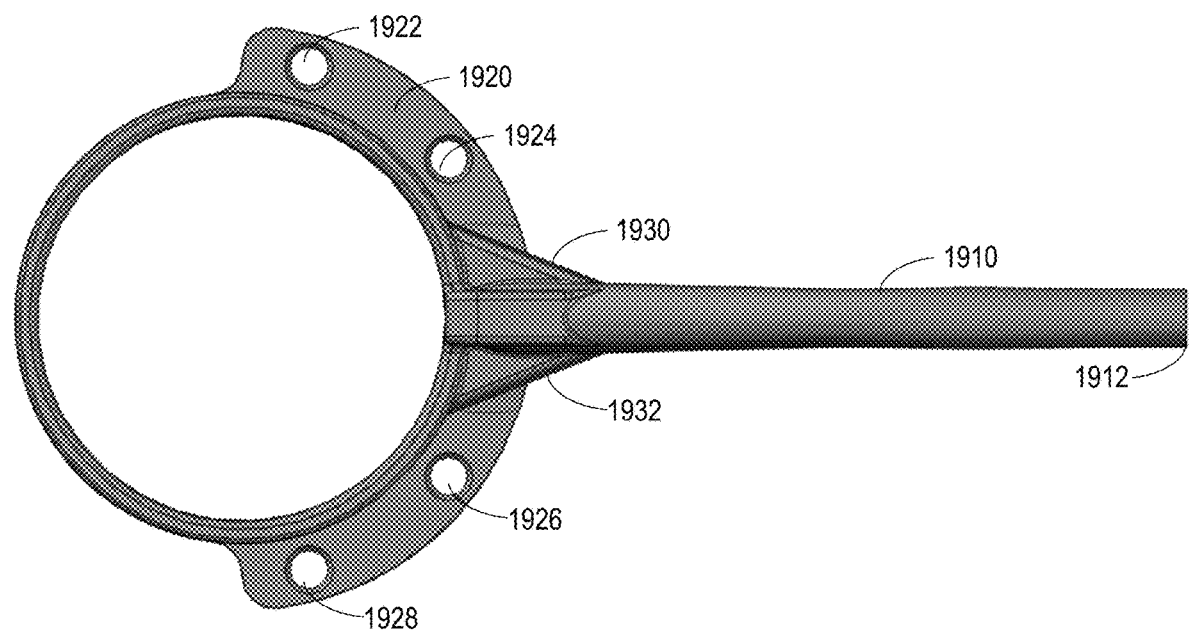
Figure 19B:
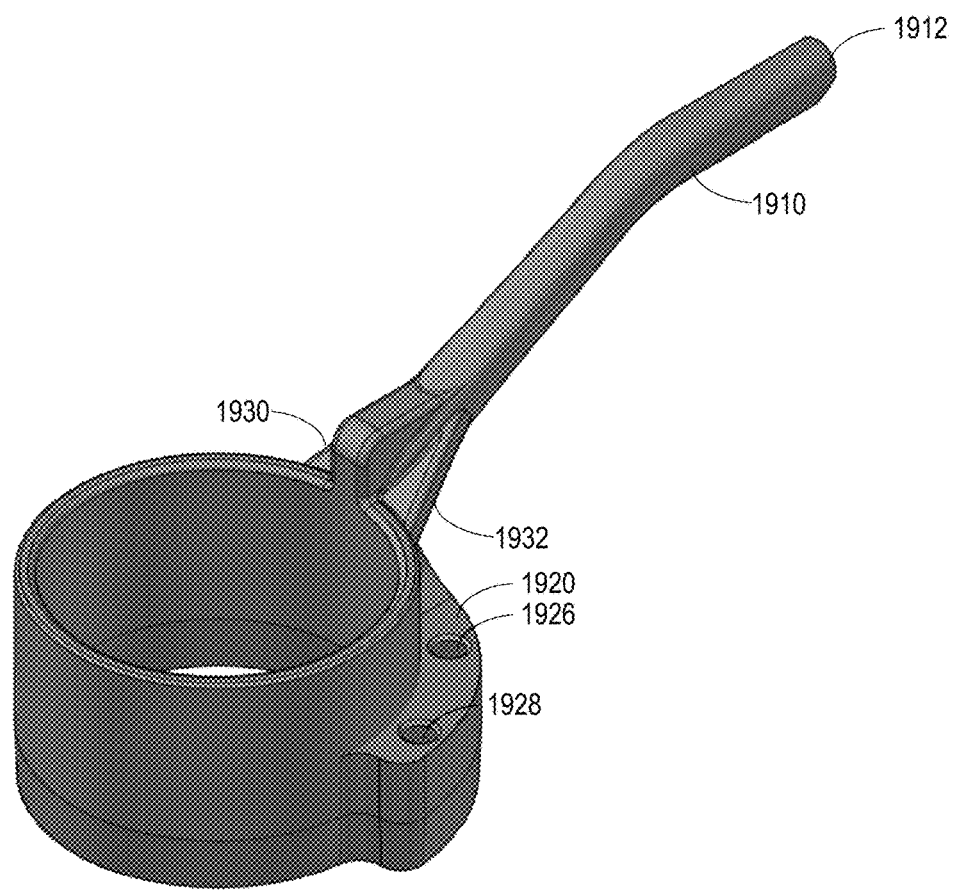

FIGS. 19A-19B are perspective views of an example implementation of a unitary assembly of an example tube 1910 and an example boost body 1920. While not shown in the example of FIGS. 19A-19B, the example tube 1910 continues from the bottom side of the boost body 1920, similar to as shown in FIG. 11A. Therefore, in this implementation, the tube 1910 connects into the boost body 178. In this example, the example boost body 1920 contains four holes 1922, 1924, 1926, 1928 that may be utilized to fasten the boost body 1920 to the boost body 178. In other examples, one hole, two holes, three holes, or more than four holes may be utilized to fasten the boost body 1920 to the boost body 178. In this example, the tube 1910 is additionally connected to the collar by two arms 1930, 1932. In some examples, the arms 1930, 1932 may be manufactured using a separate additive manufacturing process than the process to unify the tube 1910 and the boost body 1920. The separate additive manufacturing process may be employed to print parts on a previously machined piece. While there are two arms 1930, 1932 shown in this example, in other implementations there may be one arm or more than two arms. In this example, the arms 1930 and 1932 are web-like structures that provide structural support (e.g., strength and rigidity) to the tube 1910. However, the arms 1930 and 1932 may have other shapes, geometries, etc. to provide the same or a similar function. In this example, the boost body 1920 has a circular cross-sectional shape. However, in other examples, the boost body 1920 may be any other suitable shape (e.g., a semicircle, an ellipse, an oval, a square, etc.). In this example, the end of the tube 1912 points away from the boost body 1920. However, in other examples, the tube 1910 may be formable in a different direction, or, additionally or alternatively, pointed in a predetermined direction other than that depicted in FIGS. 19A-19B. In this example, the tube 1910 emerges from the midpoint between holes 1924 and 1926 on the boost body 1920. In other examples, the tube 1910 may emerge from another location along the boost body 1920. While FIGS. 19A-19B depict one tube 1910, more than one tube may be utilized in other implementations.

Figure 20A:
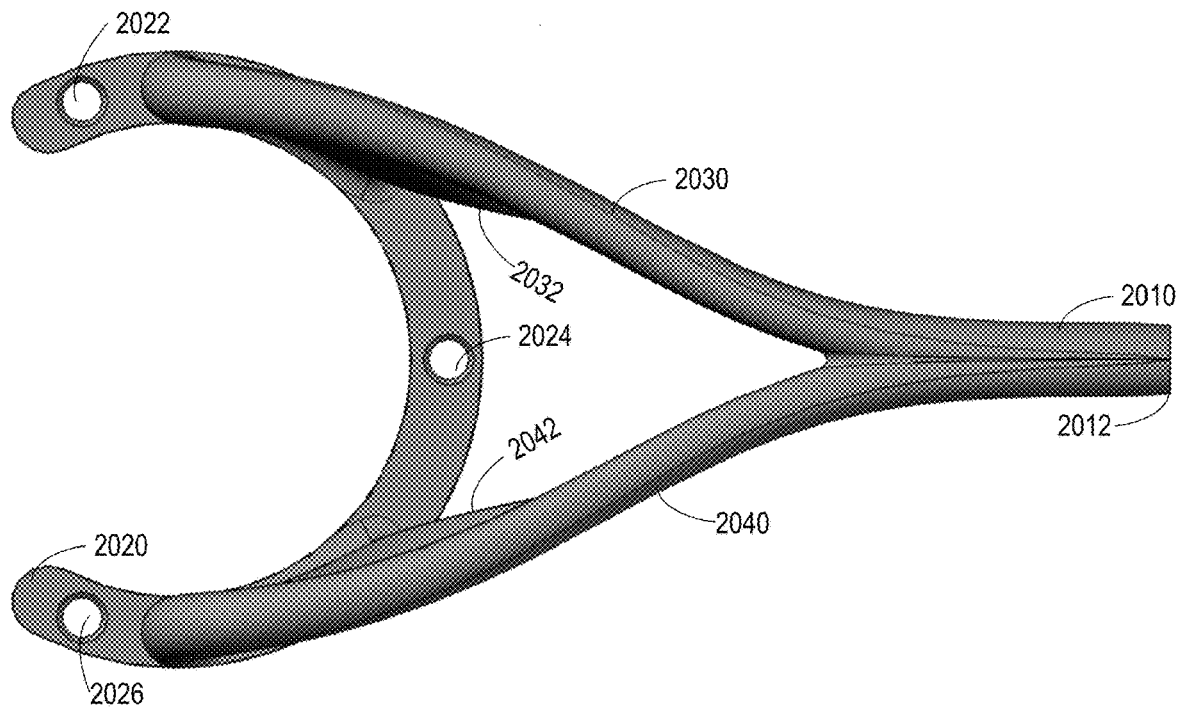
Figure 20B:
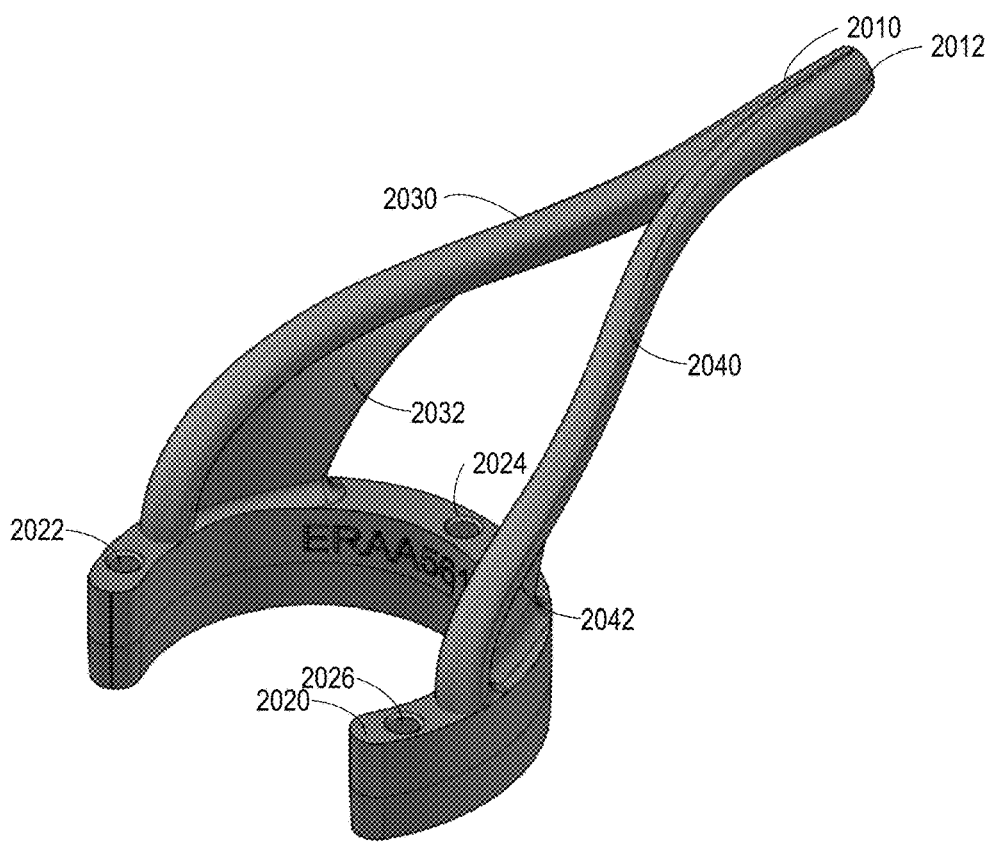

FIGS. 20A-20B are perspective views of an example implementation of a unitary assembly of an example tube 2010 and an example boost body 2020. While not shown in the example of FIGS. 20A-20B, the example tube 2010 continues from the bottom side of the boost body 2020, similar to as shown in FIG. 11A. Therefore, in this implementation, the tube 2010 connects into the boost body 178. In this example, the tube 2010 further includes a first tube 2030 and a second tube 2040 that extend from different positions on the boost body 2020 and converge to form a third tube 2010. In this example, the first tube 2030 and the second tube 2040 are supported by a first arm 2032 and a second arm 2042, respectively, the first tube 2030, the first arm 2032, and the boost body (i.e., the boost body 2020) forming a unitary structure and the second tube 2040, the second arm 2042, and the boost body 2020 forming a unitary structure. While there are two arms 2032, 2042 shown in this example, in other implementations there may be one arm or more than two arms. In this example, the arms 2032 and 2042 are web-like structures that provide structural support (e.g., strength and rigidity) to the tube 2010. However, the arms 2032 and 2042 may have other shapes, geometries, etc. to provide the same or a similar function. In this example, the boost body 2020 has holes 2022, 2024, 2026 that may be utilized to fasten the boost body 2020 to the boost body 178. In other examples, one hole, two holes, or more than three holes may be utilized to fasten the boost body 2020 to the boost body 178. In some examples, the arms 2032, 2042 may be manufactured using a separate additive manufacturing process than the process to unify the tube 2010 and the boost body 2020. The separate additive manufacturing process may be employed to print parts on a previously machined piece. In this example, the boost body 2020 is shaped as a partial circle. However, in other examples, the boost body 2020 may be any other suitable shape (e.g., a semicircle, an ellipse, an oval, a square, etc.). In this example, the end of the tube 2012 points away from the boost body 2020. However, in other examples, the tube 2010 may be formable in a different direction, or, additionally or alternatively, pointed in a predetermined direction other than that depicted in FIGS. 20A-20B. In this example, the tubes 2030, 2040 emerge from two locations opposite each other on the boost body 2020. In other examples, the tubes 2030, 2040 may emerge from various locations on the boost body 2020 and relative positions to each other. While FIGS. 20A-20B depict two tubes 2030, 2040 forming into one tube 2010, more than two tubes may alternatively join to form more than one tube in other implementations.

Figure 21A:
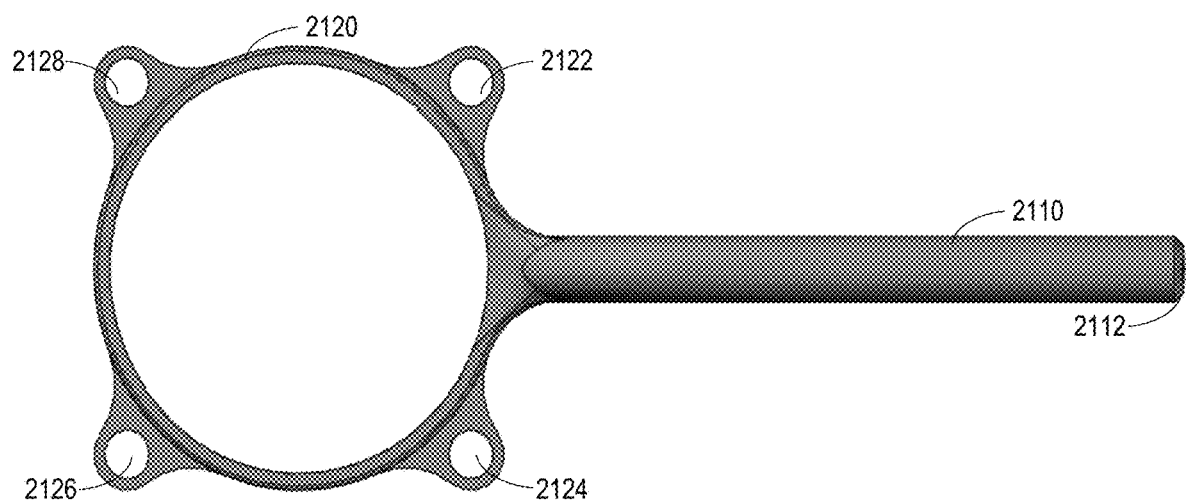
Figure 21B:
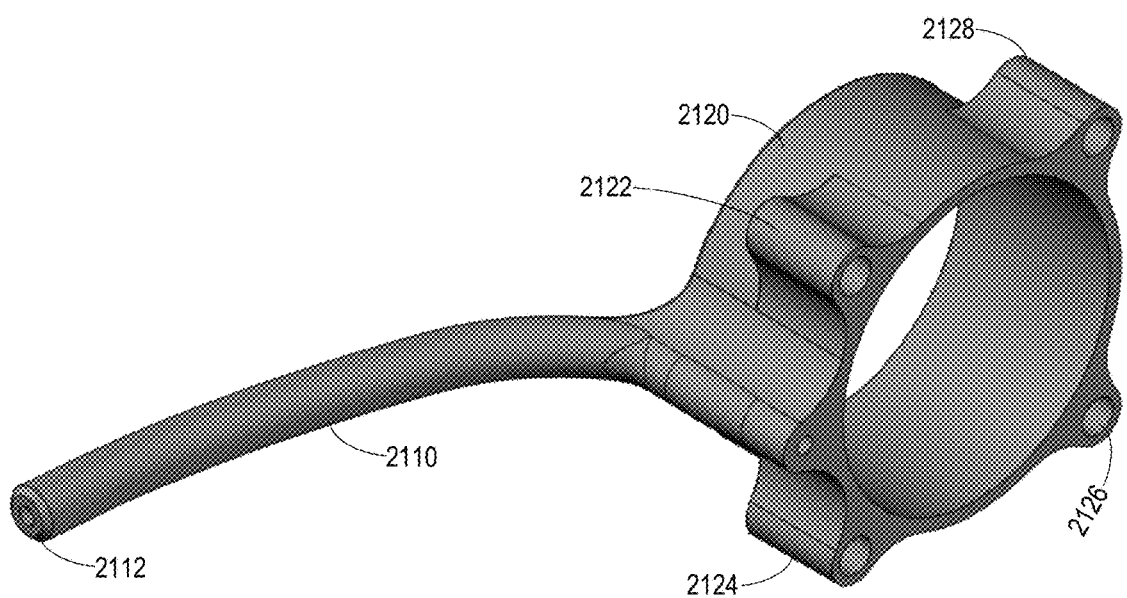

FIGS. 21A-21B are perspective views of an example implementation of the unitary assembly of the example tube 2110 and the example boost body 2120. While not shown in the example of FIGS. 21A-21B, the example tube 2110 continues from the bottom side of the boost body 2120, similar to as shown in FIG. 11A. Therefore, in this implementation, the tube 2110 connects into the boost body 178. In this example, the boost body 2120 has four holes 2122, 2124, 2126, 2128 that may be utilized to fasten the boost body 2120 to the boost body 178. In other examples, one hole, two holes, three holes, or more than four holes may be utilized to fasten the boost body 2120 to the boost body 178. In this example, the boost body 2120 is shaped as a circle. However, in other examples, the boost body 2120 may be any other suitable shape (e.g., a semicircle, an ellipse, an oval, a square, etc.). In this example, the end of the tube 2112 points away from the boost body 2120. However, in other examples, the tube 2110 may be formable in a different direction, or, additionally or alternatively, pointed in a predetermined direction other than that depicted in FIGS. 21A-21B. In this example, the tube 2110 emerges from the midpoint between holes 2122 and 2124 on the boost body 2120. In other examples, the tube 2110 may emerge from another location on the boost body 2120. While FIGS. 21A-21B depicts one tube 2110, more than one tube may be utilized in other implementations. Further, while arms, fillets, or other support structures are not pictured in the example of FIGS. 21A-21B, other implementations of the structure of FIGS. 21A-21B may include support structures of varying shapes and sizes between the tube 2110 and the boost body 2120.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that provide a plug assembly with a relatively long pitot tube, which enables the pressure sense chamber to sense pressure further downstream of the valve. The examples disclosed herein also enable the tube to be re-oriented based on the orientation of the valve body and actuator casing.

Examples and example combinations disclosed herein include the following:

Example 1 includes a pressure regulator comprising a valve body defining a fluid passageway between an inlet and an outlet, a seat in the fluid passageway, an actuator casing coupled to the valve body, the actuator casing defining a pressure sense chamber and a channel between the pressure sense chamber and the fluid passageway in the valve body, and a plug assembly including a stem, a plug coupled to the stem, a stem guide disposed in the channel of the actuator casing, the stem moveable in the stem guide to move the plug relative to the seat, the stem guide having a first side facing the pressure sense chamber and a second side facing the fluid passageway, the stem guide having a flange with a notch, a boost body on the second side of the stem guide, and a tube extending through the boost body, the tube and the boost body forming a unitary structure to prevent movement of the tube relative to the boost body, the tube having a first end and a second end, the first end aligned with the notch and the second end disposed in a downstream location relative to the seat such that the pressure sense chamber is in fluid communication with the downstream location, wherein the boost body is rotatable with respect to the stem guide to position the tube in at least one other orientation relative to the actuator casing.

Example 2 includes the pressure regulator of example 1, wherein a portion of the tube between the boost body and the second end is curved.

Example 3 includes the pressure regulator of example 2, wherein the portion of the tube between the boost body and the second end is formable.

Example 4 includes the pressure regulator of example 2, wherein the portion of the tube is supported by a first arm of the boost body and a second arm of the boost body.

Example 5 includes the pressure regulator example 4, wherein the first arm and the second arm of the boost body are unitary with the boost body and the tube.

Example 6 includes the pressure regulator of example 2, wherein the portion of the tube is bent to form a first portion and a second portion, the first portion nearest to the boost body and the second portion nearest to the second end of the tube, and an arm connects the first portion and the second portion, the arm, the first portion, and the second portion forming a unitary structure.

Example 7 includes the pressure regulator of example 2, wherein the portion of the tube is bent to form a first portion, a second portion, and a third portion, wherein the first portion is at a first orientation, the second portion is at a second orientation different than the first orientation, and the third portion is at a third orientation different than the first and second orientations.

Example 8 includes the pressure regulator of example 1, wherein the tube further includes a first tube and a second tube that extend from different positions on the boost body and converge to form a third tube.

Example 9 includes the pressure regulator of example 8, wherein the first tube and the second tube are supported by a first arm and a second arm, respectively, the first tube, the first arm, and the boost body forming a unitary structure and the second tube, the second arm, and the boost body forming a unitary structure.

Example 10 includes a pressure regulator comprising a valve body defining a fluid passageway between an inlet and an outlet, a seat in the fluid passageway, an actuator casing coupled to the valve body, the actuator casing defining a pressure sense chamber and a channel between the pressure sense chamber and the fluid passageway in the valve body, and a plug assembly including a stem, a plug coupled to the stem, a stem guide disposed in the channel of the actuator casing, the stem moveable in the stem guide to move the plug relative to the seat, the stem guide having a first side facing the pressure sense chamber and a second side facing the fluid passageway, the stem guide having a flange with a notch, and means for orienting a boost body with a tube from a first orientation to a second orientation relative to the valve body.

Example 11 includes the pressure regulator of example 10, wherein a first end of the tube is disposed in the notch.

Example 12 includes the pressure regulator of example 11, wherein the means for rotating the boost body is moveable away from the stem guide to move the first end of the tube out of the notch.

Example 13 includes the pressure regulator of example 10, wherein the means for rotating the boost body includes a flange of the stem guide that has four notches, wherein the boost body can be rotated to four positions to align the first end of the tube with a corresponding one of the notches.

Example 14 includes the pressure regulator of example 10, wherein the tube is curved to include a 90° turn.

Example 15 includes a plug assembly for a pressure regulator, the plug assembly comprising a boost body on a side of a stem guide, and a tube extending through a boost body, the tube and the boost body forming a unitary structure to prevent movement of the tube relative to the boost body, the tube having a first end and a second end, the first end aligned with a first notch on the stem guide and the second end to be disposed in a downstream location relative to a seat in a fluid passageway such that a pressure sense chamber is in fluid communication with the downstream location, wherein the boost body is moveable away from the side of the stem guide and rotatable relative to the stem guide to position the tube in a second notch on the stem guide.

Example 16 includes the plug assembly of example 15, wherein a portion of the tube between the boost body and the second end is curved.

Example 17 includes the pressure regulator of example 16, wherein the portion of the tube is supported by a first arm of the boost body and a second arm of the boost body, the first arm and the second arm are unitary with the boost body and the tube.

Example 18 includes the pressure regulator of example 16, wherein the portion of the tube is curved to form a first portion and a second portion, the first portion nearest to the boost body and the second portion nearest to the second end of the tube, and wherein an arm connects the first portion and the second portion, the arm, the first portion, and the second portion forming a unitary structure.

Example 19 includes the pressure regulator of example 16, wherein the portion of the tube is curved to form a first portion, a second portion, and a third portion, wherein the first portion is at a first orientation, the second portion is at a second orientation, and the third portion is at a third orientation.

Example 20 includes the pressure regulator of example 1, wherein the tube further includes a first tube and a second tube that extend from different positions on the boost body and converge to form a third tube, the first tube and the second tube are supported by a first arm and a second arm, respectively, the first tube, the first arm, and the boost body forming a unitary structure and the second tube, the second arm, and the boost body forming a unitary structure.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A pressure regulator comprising:
   a valve body defining a fluid passageway between an inlet and an outlet;
   a seat in the fluid passageway;
   an actuator casing coupled to the valve body, the actuator casing defining a pressure sense chamber and a channel between the pressure sense chamber and the fluid passageway in the valve body; and
   a plug assembly including:
      a stem;
      a plug coupled to the stem;
      a stem guide disposed in the channel of the actuator casing, the stem moveable in the stem guide to move the plug relative to the seat, the stem guide having a first side facing the pressure sense chamber and a second side facing the fluid passageway;
      a boost body on the second side of the stem guide; and
      a tube extending through the boost body, the tube and the boost body forming a unitary structure to prevent movement of the tube relative to the boost body, the tube having a first end and a second end, the second end disposed in a downstream location relative to the seat such that the pressure sense chamber is in fluid communication with the downstream location, wherein a portion of the tube between the boost body and the second end is curved and supported by a first arm and a second arm of the boost body, and wherein the boost body is rotatable with respect to the stem guide to position the tube in at least one other orientation relative to the actuator casing.

2. The pressure regulator claim 1, wherein the first arm and the second arm of the boost body are unitary with the boost body and the tube.

3. The pressure regulator of claim 1, wherein the portion is a first portion, and wherein a second portion of the tube is straight.

4. A pressure regulator comprising:
   a valve body defining a fluid passageway between an inlet and an outlet;
   a seat in the fluid passageway;
   an actuator casing coupled to the valve body, the actuator casing defining a pressure sense chamber and a channel between the pressure sense chamber and the fluid passageway in the valve body; and
   a plug assembly including:
      a stem;
      a plug coupled to the stem;
      a stem guide disposed in the channel of the actuator casing, the stem moveable in the stem guide to move the plug relative to the seat, the stem guide having a first side facing the pressure sense chamber and a second side facing the fluid passageway;
      a boost body on the second side of the stem guide; and
      a tube extending through the boost body, the tube and the boost body forming a first unitary structure to prevent movement of the tube relative to the boost body, the tube having a first end and a second end, the second end disposed in a downstream location relative to the seat such that the pressure sense chamber is in fluid communication with the downstream location, wherein a portion of the tube between the boost body and the second end is curved, wherein the portion of the tube is curved to form a first portion and a second portion, the first portion nearest to the boost body and the second portion nearest to the second end of the tube, and a web connects the first portion and the second portion, the web, the first portion, and the second portion forming a second unitary structure, and wherein the boost body is rotatable with respect to the stem guide to position the tube in at least one other orientation relative to the actuator casing.

5. The pressure regulator of claim 4, wherein the portion of the tube is curved to form the first portion, the second portion, and a third portion, wherein the first portion is at a first orientation, the second portion is at a second orientation different than the first orientation, and the third portion is at a third orientation different than the first and second orientations.

6. A pressure regulator comprising:
a valve body defining a fluid passageway between an inlet and an outlet;
a seat in the fluid passageway;
an actuator casing coupled to the valve body, the actuator casing defining a pressure sense chamber and a channel between the pressure sense chamber and the fluid passageway in the valve body; and
a plug assembly including:
  a stem;
  a plug coupled to the stem;
  a stem guide disposed in the channel of the actuator casing, the stem moveable in the stem guide to move the plug relative to the seat, the stem guide having a first side facing the pressure sense chamber and a second side facing the fluid passageway;
  a boost body on the second side of the stem guide; and
  a tube extending through the boost body, the tube and the boost body forming a unitary structure to prevent movement of the tube relative to the boost body, the tube having a first end and a second end, the second end disposed in a downstream location relative to the seat such that the pressure sense chamber is in fluid communication with the downstream location, wherein the tube includes a first tube and a second tube that extend from different positions on the boost body and converge to form a third tube, and wherein the boost body is rotatable with respect to the stem guide to position the tube in at least one other orientation relative to the actuator casing.

7. The pressure regulator of claim 6, wherein the first tube and the second tube are supported by a first arm and a second arm, respectively, the first tube, the first arm, and the boost body forming a first unitary structure and the second tube, the second arm, and the boost body forming a second unitary structure.

8. A pressure regulator comprising:
a valve body defining a fluid passageway between an inlet and an outlet;
a seat in the fluid passageway;
an actuator casing coupled to the valve body, the actuator casing defining a pressure sense chamber and a channel between the pressure sense chamber and the fluid passageway in the valve body; and
a plug assembly including:
  a stem;
  a plug coupled to the stem;
  a stem guide disposed in the channel of the actuator casing, the stem moveable in the stem guide to move the plug relative to the seat, the stem guide having a first side facing the pressure sense chamber and a second side facing the fluid passageway; and
  a key to orient a boost body with a tube from a first predetermined orientation to a second predetermined orientation relative to the valve body, wherein the key includes at least one projection that corresponds to a notch in the boost body.

9. The pressure regulator of claim 8, wherein a first end of the tube is disposed in the boost body.

10. The pressure regulator of claim 9, wherein the boost body includes at least one notch to align with the tube.

11. The pressure regulator of claim 8, wherein the tube is curved to include a 90° turn.

12. A plug assembly for a pressure regulator, the plug assembly comprising:
a boost body on a side of a stem guide; and
a tube extending through the boost body, the tube and the boost body forming a unitary structure to prevent movement of the tube relative to the boost body, the tube having a first end and a second end, the second end to be disposed in a downstream location relative to a seat in a fluid passageway such that a pressure sense chamber is in fluid communication with the downstream location, wherein the boost body is moveable away from the side of the stem guide and rotatable relative to the stem guide to position the tube.

13. The plug assembly of claim 12, wherein a portion of the tube between the boost body and the second end is curved.

14. The plug assembly of claim 12, wherein a portion of the tube between the boost body and the second end is straight.

15. The plug assembly of claim 12, wherein the first end of the tube is disposed in the boost body.

16. The plug assembly of claim 15, wherein the boost body includes at least one notch to align with the tube.

17. The plug assembly of claim 12, wherein the boost body is rotated relative to a key including at least one projection that corresponds to a notch in the boost body.

* * * * *